US012496276B2

(12) United States Patent
Hutchens et al.

(10) Patent No.: US 12,496,276 B2
(45) Date of Patent: Dec. 16, 2025

(54) AGENTS FOR ORAL COMPOSITION

(71) Applicant: NICOVENTURES TRADING LIMITED, London (GB)

(72) Inventors: Ronald K. Hutchens, East Bend, NC (US); Anthony Richard Gerardi, Winston-Salem, NC (US); Philip Richard Hunt, Malmo (SE); Christopher Keller, Advance, NC (US); Thomas H. Poole, Winston-Salem, NC (US)

(73) Assignee: Nicoventures Trading Limited, London (GB)

( * ) Notice: Subject to any disclaimer, the term of this patent is extended or adjusted under 35 U.S.C. 154(b) by 415 days.

(21) Appl. No.: 17/170,998

(22) Filed: Feb. 9, 2021

(65) Prior Publication Data

US 2021/0169806 A1    Jun. 10, 2021

Related U.S. Application Data

(63) Continuation of application No. PCT/IB2020/061546, filed on Dec. 4, 2020.

(60) Provisional application No. 62/945,640, filed on Dec. 9, 2019.

(51) Int. Cl.
A61K 9/14 (2006.01)
A61K 9/00 (2006.01)
A61K 9/48 (2006.01)
A61K 31/465 (2006.01)
A61K 31/522 (2006.01)

(52) U.S. Cl.
CPC ............ *A61K 9/146* (2013.01); *A61K 9/0056* (2013.01); *A61K 9/4866* (2013.01); *A61K 31/465* (2013.01); *A61K 31/522* (2013.01)

(58) Field of Classification Search
CPC .... A61K 9/146; A61K 9/0056; A61K 9/4866; A61K 31/465; A61K 31/522
USPC ........................................................ 424/452
See application file for complete search history.

(56) References Cited

U.S. PATENT DOCUMENTS

| | | |
|---|---|---|
| 4,374,155 A | 2/1983 | Igoe et al. |
| 5,417,229 A | 5/1995 | Summers et al. |
| 5,496,573 A | 3/1996 | Tsuji et al. |
| 6,138,683 A | 10/2000 | Hersh et al. |
| 6,845,777 B2 | 1/2005 | Pera |
| 6,958,143 B2 | 10/2005 | Choi et al. |
| 7,032,601 B2 | 4/2006 | Atchley et al. |
| 7,056,541 B1 | 6/2006 | Stahl et al. |
| 7,507,427 B2 | 3/2009 | Andersen et al. |
| 7,810,507 B2 | 10/2010 | Dube et al. |
| 7,833,555 B2 | 11/2010 | Andersen et al. |
| 7,861,728 B2 | 1/2011 | Holton, Jr. et al. |
| 7,900,637 B2 | 3/2011 | Fagerstrom et al. |
| 7,950,399 B2 | 5/2011 | Winterson et al. |
| 8,069,861 B2 | 12/2011 | Sinclair |
| 8,124,147 B2 | 2/2012 | Cheng et al. |
| 8,293,295 B2 | 10/2012 | Andersen et al. |
| 8,336,557 B2 | 12/2012 | Kumar et al. |
| 8,343,532 B2 | 1/2013 | Dam et al. |
| 8,424,541 B2 | 4/2013 | Crawford et al. |
| 8,469,036 B2 | 6/2013 | Williams et al. |
| 8,469,037 B2 | 6/2013 | Liu et al. |
| 8,529,875 B2 | 9/2013 | Andersen |
| 8,529,914 B2 | 9/2013 | Fuisz et al. |
| 8,545,870 B2 | 10/2013 | Dupinay et al. |
| 8,591,967 B2 | 11/2013 | Andersen et al. |
| 8,613,285 B2 | 12/2013 | Fuisz |
| 8,627,828 B2 | 1/2014 | Strickland et al. |
| 8,642,016 B2 | 2/2014 | Chau et al. |
| 8,714,163 B2 | 5/2014 | Kumar et al. |
| 8,741,348 B2 | 6/2014 | Hansson et al. |
| 8,747,562 B2 | 6/2014 | Mishra et al. |
| 8,828,361 B2 | 9/2014 | Anderson |
| 8,833,378 B2 | 9/2014 | Axelsson et al. |
| 8,846,075 B2 | 9/2014 | Johnson et al. |
| 8,858,984 B2 | 10/2014 | Dam et al. |
| 8,863,755 B2 | 10/2014 | Zhuang et al. |
| 8,871,243 B2 | 10/2014 | Fankhauser et al. |
| 8,931,493 B2 | 1/2015 | Sebastian et al. |
| 8,945,593 B2 | 2/2015 | LoCoco et al. |
| 8,978,661 B2 | 3/2015 | Atchley et al. |
| 8,992,974 B2 | 3/2015 | McCarty |
| 9,027,567 B2 | 5/2015 | Gee et al. |
| 9,039,839 B2 | 5/2015 | Beeson et al. |
| 9,044,035 B2 | 6/2015 | Jackson et al. |
| 9,084,439 B2 | 7/2015 | Holton, Jr. |
| 9,155,321 B2 | 10/2015 | Cantrell et al. |
| 9,161,567 B2 | 10/2015 | Shikata et al. |
| 9,161,908 B2 | 10/2015 | Nilsson |
| 9,167,835 B2 | 10/2015 | Sengupta et al. |

(Continued)

FOREIGN PATENT DOCUMENTS

| | | |
|---|---|---|
| AU | 20120207021 | 8/2012 |
| CN | 103005680 | 4/2013 |

(Continued)

OTHER PUBLICATIONS

Belscak-Cvitanovic (Food Chemistry, 167, pp. 378-386). (Year: 2015).*

(Continued)

*Primary Examiner* — Adam C Milligan
(74) *Attorney, Agent, or Firm* — Womble Bond Dickinson (US) LLP

(57) ABSTRACT

The disclosure provides compositions and products configured for oral use. For example, a composition is provided that includes a foam containing a lipid and an active agent and/or a flavorant, and a carrier, wherein the foam is adsorbed onto the carrier. Such a foam can be incorporated, e.g., within lozenges and/or pouched oral products. The disclosure further provides an oral product (e.g., a lozenge and/or pouched oral product) including an encapsulated agent, wherein the encapsulated agent is a porous bead with an exterior portion and an interior portion containing a lipid and an active agent and/or a flavorant.

25 Claims, 2 Drawing Sheets

(56) References Cited

U.S. PATENT DOCUMENTS

| | | | |
|---|---|---|---|
| 9,185,931 B2 | 11/2015 | Gao et al. | |
| 9,204,667 B2 | 12/2015 | Cantrell et al. | |
| 9,237,768 B2 | 1/2016 | Carroll et al. | |
| 9,358,296 B2 | 6/2016 | McCarty | |
| 9,372,033 B2 | 6/2016 | Lampe et al. | |
| 9,386,800 B2 | 7/2016 | Sebastian et al. | |
| 9,402,414 B2 | 8/2016 | Griscik et al. | |
| 9,402,809 B2 | 8/2016 | Axelsson et al. | |
| 9,414,624 B2 | 8/2016 | Carroll et al. | |
| 9,420,825 B2 | 8/2016 | Beeson et al. | |
| 9,468,233 B2 | 10/2016 | Macko et al. | |
| 9,474,303 B2 | 10/2016 | Holton, Jr. | |
| 9,521,864 B2 | 12/2016 | Gao et al. | |
| 9,565,867 B2 | 2/2017 | Wittorff et al. | |
| 9,629,392 B2 | 4/2017 | Holton, Jr. | |
| 9,675,102 B2 | 6/2017 | Hunt et al. | |
| 9,763,928 B2 | 9/2017 | Duggins et al. | |
| 9,775,376 B2 | 10/2017 | Cantrell et al. | |
| 9,801,409 B1 | 10/2017 | Smith | |
| 9,848,634 B2 | 12/2017 | Fuisz | |
| 9,854,830 B2 | 1/2018 | Gao et al. | |
| 9,884,015 B2 | 2/2018 | Gao et al. | |
| 9,907,748 B2 | 3/2018 | Borschke et al. | |
| 9,925,145 B2 | 3/2018 | Hubinette et al. | |
| 9,930,909 B2 | 4/2018 | Gao et al. | |
| 9,999,243 B2 | 6/2018 | Gao et al. | |
| 10,039,309 B2 | 8/2018 | Carroll et al. | |
| 10,045,976 B2 | 8/2018 | Fusco et al. | |
| 10,092,715 B2 | 10/2018 | Axelsson et al. | |
| 10,130,120 B2 | 11/2018 | Mishra et al. | |
| 10,143,230 B2 | 12/2018 | Mishra et al. | |
| 10,149,850 B2 | 12/2018 | Mishra et al. | |
| 10,172,810 B2 | 1/2019 | McCarty | |
| 10,244,786 B2 | 4/2019 | Gao et al. | |
| 10,334,873 B2 | 7/2019 | Mishra et al. | |
| 10,357,054 B2 | 7/2019 | Marshall et al. | |
| 10,375,984 B2 | 8/2019 | Hernandez Garcia et al. | |
| 10,426,726 B2 | 10/2019 | Neergaard | |
| 10,463,070 B2 | 11/2019 | Carroll et al. | |
| 10,532,046 B2 | 1/2020 | Rogers et al. | |
| 10,543,205 B2 | 1/2020 | Wittorff et al. | |
| 2004/0118422 A1 | 6/2004 | Lundin et al. | |
| 2004/0131752 A1 | 7/2004 | Best et al. | |
| 2005/0118272 A1 | 6/2005 | Besse et al. | |
| 2005/0255768 A1 | 11/2005 | Iwasaki et al. | |
| 2006/0272663 A1 | 12/2006 | Dube et al. | |
| 2007/0031539 A1 | 2/2007 | Calton | |
| 2007/0122526 A1 | 5/2007 | Sweeney et al. | |
| 2008/0081071 A1 | 4/2008 | Sanghvi et al. | |
| 2008/0112989 A1 | 5/2008 | Wieland et al. | |
| 2008/0166395 A1 | 7/2008 | Roush | |
| 2008/0317911 A1 | 12/2008 | Schleef et al. | |
| 2009/0023819 A1 | 1/2009 | Axelsson | |
| 2009/0065013 A1 | 3/2009 | Essen et al. | |
| 2009/0133703 A1* | 5/2009 | Strickland | A23L 27/79 131/366 |
| 2009/0253754 A1 | 10/2009 | Selmin et al. | |
| 2009/0293895 A1* | 12/2009 | Axelsson | A61K 9/009 131/352 |
| 2009/0301504 A1 | 12/2009 | Worthen et al. | |
| 2010/0004294 A1 | 1/2010 | Axelsson et al. | |
| 2010/0061940 A1 | 3/2010 | Axelsson et al. | |
| 2010/0187143 A1 | 7/2010 | Essen et al. | |
| 2010/0260690 A1 | 10/2010 | Kristensen et al. | |
| 2010/0294290 A1 | 11/2010 | Zhang | |
| 2010/0294292 A1 | 11/2010 | Hodin et al. | |
| 2010/0330247 A1 | 12/2010 | Montaigne et al. | |
| 2011/0139164 A1 | 6/2011 | Mua et al. | |
| 2011/0220130 A1 | 9/2011 | Mua et al. | |
| 2011/0268809 A1 | 11/2011 | Brinkley et al. | |
| 2012/0031415 A1 | 2/2012 | Essen et al. | |
| 2012/0037175 A1 | 2/2012 | Cantrell et al. | |
| 2012/0039981 A1 | 2/2012 | Pedersen et al. | |
| 2012/0103353 A1 | 5/2012 | Sebastian et al. | |
| 2013/0078307 A1 | 3/2013 | Holton, Jr. et al. | |
| 2013/0118512 A1 | 5/2013 | Jackson et al. | |
| 2013/0152953 A1* | 6/2013 | Mua | A24B 13/00 131/111 |
| 2013/0177646 A1 | 7/2013 | Hugerth et al. | |
| 2013/0206150 A1 | 8/2013 | Duggins et al. | |
| 2013/0251779 A1 | 9/2013 | Svandal et al. | |
| 2013/0340773 A1 | 12/2013 | Sebastian et al. | |
| 2014/0123986 A1 | 5/2014 | Strickland et al. | |
| 2014/0130813 A1 | 5/2014 | Strehle | |
| 2014/0154301 A1 | 6/2014 | Chau et al. | |
| 2014/0178580 A1 | 6/2014 | Whiffen | |
| 2014/0255452 A1 | 9/2014 | Reddick et al. | |
| 2014/0274940 A1 | 9/2014 | Mishra et al. | |
| 2015/0068544 A1 | 3/2015 | Moldoveanu et al. | |
| 2015/0068545 A1 | 3/2015 | Moldoveanu et al. | |
| 2015/0071972 A1 | 3/2015 | Holton, Jr. et al. | |
| 2015/0096573 A1 | 4/2015 | Gao et al. | |
| 2015/0096574 A1 | 4/2015 | Gao et al. | |
| 2015/0096576 A1 | 4/2015 | Gao et al. | |
| 2015/0296868 A1 | 10/2015 | Sutton | |
| 2015/0296874 A1 | 10/2015 | Awty et al. | |
| 2016/0000140 A1 | 1/2016 | Sebastian et al. | |
| 2016/0073676 A1 | 3/2016 | Cantrell et al. | |
| 2016/0073689 A1 | 3/2016 | Sebastian et al. | |
| 2016/0157515 A1 | 6/2016 | Chapman et al. | |
| 2016/0192703 A1 | 7/2016 | Sebastian et al. | |
| 2017/0007594 A1 | 1/2017 | Borschke | |
| 2017/0164651 A1 | 6/2017 | Mua et al. | |
| 2017/0165252 A1 | 6/2017 | Mua et al. | |
| 2017/0172995 A1 | 6/2017 | Repaka et al. | |
| 2017/0280764 A1 | 10/2017 | Sahlen et al. | |
| 2017/0312261 A1 | 11/2017 | Changoer et al. | |
| 2017/0318858 A1 | 11/2017 | Hodin et al. | |
| 2018/0140007 A1 | 5/2018 | Aspgren et al. | |
| 2018/0140521 A1 | 5/2018 | Geonnotti et al. | |
| 2018/0140554 A1 | 5/2018 | Wittorff | |
| 2018/0153211 A1 | 6/2018 | Persson | |
| 2018/0235273 A1 | 8/2018 | Carroll et al. | |
| 2018/0255826 A1 | 9/2018 | Persson et al. | |
| 2018/0257801 A1 | 9/2018 | Persson | |
| 2019/0037909 A1 | 2/2019 | Greenbaum et al. | |
| 2019/0255035 A1 | 8/2019 | Bruun | |
| 2020/0037638 A1 | 2/2020 | Faraci et al. | |
| 2020/0128870 A1 | 4/2020 | Hassler et al. | |
| 2020/0138706 A1 | 5/2020 | Rudraraju et al. | |
| 2020/0275689 A1 | 9/2020 | Lewerenz | |
| 2020/0297026 A1 | 9/2020 | Kannisto et al. | |
| 2020/0305496 A1 | 10/2020 | Gessesse | |

FOREIGN PATENT DOCUMENTS

| | | |
|---|---|---|
| CN | 103263507 | 8/2013 |
| CN | 103494324 | 1/2014 |
| CN | 105192876 | 12/2015 |
| CN | 105595404 | 5/2016 |
| WO | WO 2006/119660 | 11/2006 |
| WO | WO 2018/129097 | 7/2018 |
| WO | WO 2018/224546 | 12/2018 |
| WO | WO2019/036243 | 2/2019 |

OTHER PUBLICATIONS

Robichaud Meagan et al., "Tobacco companies introduce 'tobacco free' nicotine pouches", Tob Control 2019, Nov. 21, 2019, 1-2, National Library of Medicine, doi:10.1136/tobaccocontrol-2019-055321.

Constant Comments: Cindi Bigelow, Alice Truong, 2008, Northwestern Magazine, Winter 2008 (Year: 2008) https://www.northwestern.edu/magazine/winter2008/alumninews/close-ups/bigelow.html.

Siegmund et al., "Determination of the Nicotine Content of Various Edible Nightshades (*Solanaceae*) and Their Products and Estimation of the Associated Dietary Nicotine Intake," 47 *J. Agric. Food Chem.* 3113-3120 (1999.

\* cited by examiner

AGENTS FOR ORAL COMPOSITION

CROSS-REFERENCE TO RELATED APPLICATIONS

The present application is a continuation of International Application No. PCT/IB2020/061546, filed Dec. 4, 2020, and claims priority to and the benefit of U.S. Provisional App. No. 62/945,640, filed Dec. 9, 2019, both of which are incorporated herein by reference in their entireties.

FIELD OF THE DISCLOSURE

The present disclosure relates to flavored products intended for human use. The products are configured for oral use and deliver substances such as flavors and/or active ingredients during use. Such products may include tobacco or a product derived from tobacco, or may be tobacco-free alternatives.

BACKGROUND

Tobacco may be enjoyed in a so-called "smokeless" form. Particularly popular smokeless tobacco products are employed by inserting some form of processed tobacco or tobacco-containing formulation into the mouth of the user. Conventional formats for such smokeless tobacco products include moist snuff, snus, and chewing tobacco, which are typically formed almost entirely of particulate, granular, or shredded tobacco, and which are either portioned by the user or presented to the user in individual portions, such as in single-use pouches or sachets. Other traditional forms of smokeless products include compressed or agglomerated forms, such as plugs, tablets, or pellets. Alternative product formats, such as tobacco-containing gums and mixtures of tobacco with other plant materials, are also known. See for example, the types of smokeless tobacco formulations, ingredients, and processing methodologies set forth in U.S. Pat. No. 1,376,586 to Schwartz; U.S. Pat. No. 4,513,756 to Pittman et al.; U.S. Pat. No. 4,528,993 to Sensabaugh, Jr. et al.; U.S. Pat. No. 4,624,269 to Story et al.; U.S. Pat. No. 4,991,599 to Tibbetts; U.S. Pat. No. 4,987,907 to Townsend; U.S. Pat. No. 5,092,352 to Sprinkle, III et al.; U.S. Pat. No. 5,387,416 to White et al.; U.S. Pat. No. 6,668,839 to Williams; U.S. Pat. No. 6,834,654 to Williams; U.S. Pat. No. 6,953,040 to Atchley et al.; U.S. Pat. No. 7,032,601 to Atchley et al.; and U.S. Pat. No. 7,694,686 to Atchley et al.; U.S. Pat. Pub. Nos. 2004/0020503 to Williams; 2005/0115580 to Quinter et al.; 2006/0191548 to Strickland et al.; 2007/0062549 to Holton, Jr. et al.; 2007/0186941 to Holton, Jr. et al.; 2007/0186942 to Strickland et al.; 2008/0029110 to Dube et al.; 2008/0029116 to Robinson et al.; 2008/0173317 to Robinson et al.; 2008/0209586 to Neilsen et al.; 2009/0065013 to Essen et al.; and 2010/0282267 to Atchley, as well as WO2004/095959 to Arnarp et al., each of which is incorporated herein by reference.

Smokeless tobacco product configurations that combine tobacco material with various binders and fillers have been proposed more recently, with example product formats including lozenges, pastilles, gels, extruded forms, and the like. See, for example, the types of products described in U.S. Patent App. Pub. Nos. 2008/0196730 to Engstrom et al.; 2008/0305216 to Crawford et al.; 2009/0293889 to Kumar et al.; 2010/0291245 to Gao et al; 2011/0139164 to Mua et al.; 2012/0037175 to Cantrell et al.; 2012/0055494 to Hunt et al.; 2012/0138073 to Cantrell et al.; 2012/0138074 to Cantrell et al.; 2013/0074855 to Holton, Jr.; 2013/0074856 to Holton, Jr.; 2013/0152953 to Mua et al.; 2013/0274296 to Jackson et al.; 2015/0068545 to Moldoveanu et al.; 2015/0101627 to Marshall et al.; and 2015/0230515 to Lampe et al., each of which is incorporated herein by reference.

All-white snus portions are growing in popularity, and offer a discrete and aesthetically pleasing alternative to traditional snus. Such modern "white" pouched products may include a bleached tobacco or may be tobacco-free.

BRIEF SUMMARY

The present disclosure generally provides agents for oral products, e.g., compositions suitable for inclusion within products configured for oral use (including pouched products and other types of products), and further provides various such products incorporating these compositions. Compositions and products provided herein may exhibit, e.g., modified flavor characteristics and/or modified mouthfeel with respect to traditional corresponding products. The products are intended to impart a taste when used orally, and typically also deliver active ingredients to the consumer, such as nicotine and/or caffeine. The products and methods provided herein impart such taste and/or deliver such active ingredients via a composition (e.g., as incorporate on their own within a pouched product or within a lozenge) that exhibits unique delivery of such taste and/or active ingredient as compared with conventional compositions/products.

In one aspect is provided a composition, comprising: a foam comprising a lipid and a component selected from the group consisting of an active agent, a flavorant, and combinations thereof; and a carrier (e.g., microcrystalline cellulose), wherein the foam is adsorbed onto the carrier. The lipid can, in some embodiments, comprise an oil (e.g., preferably a food-grade oil). The disclosure further provides a pouched product comprising the referenced composition, as well as a lozenge comprising the referenced composition.

In some embodiments, the carrier is microcrystalline cellulose (MCC). The MCC can be, e.g., in particulate form. The active ingredient can vary and, in some embodiments, can be selected from the group consisting of a nicotine component, a botanical, a stimulant, a nutraceutical, an amino acid, a vitamin, a cannabinoid, and combinations thereof. In particular embodiments, the active ingredient comprises nicotine. In particular embodiments, the active ingredient comprises caffeine. The flavorant can vary and, in some embodiments, can be selected from the group consisting of ethyl vanillin, cinnamaldehyde, sabinene, limonene, gamma-terpinene, beta-farnesene, and citral.

The disclosure further comprises an oral product comprising the disclosed composition. The product can be, for example, in the form of a lozenge. In another embodiment, the product can be an oral product comprising a material within a porous pouch. Where the product comprises a material within a porous pouch, the material within the porous pouch may comprise the composition. In some embodiments, the porous pouch material may comprise the composition.

In another aspect, the disclosure provides an oral product comprising an encapsulated agent, wherein the encapsulated agent comprises: a porous bead comprising an exterior portion and an interior portion comprising a lipid and a component selected from the group consisting of an active agent, a flavorant, and combinations thereof. In some embodiments, the active agent is selected from the group consisting of a nicotine component, a botanical, a stimulant, a nutraceutical, an amino acid, a vitamin, a cannabinoid, and combinations thereof. In certain specific embodiments, the active agent comprises nicotine. In certain specific embodiments, the active agent comprises caffeine. In the disclosed encapsulated agents, although the composition can vary, in particular embodiments, the exterior portion comprises starch alginate.

The disclosed oral products can be, for example, in the form of a lozenge (e.g., an isomalt-based lozenge). The disclosed oral products can be, for example, in the form of an oral pouched product, comprising a material within a porous pouch. In some such embodiments, the material within the porous pouch comprises the encapsulated agent. In some such embodiments, the porous pouch material comprises a fleece, and the encapsulated agent is associated with the fleece. For example, the encapsulated agent can, in some embodiments, be imbedded in the fleece.

The active ingredient can vary and, in some embodiments, can be selected from the group consisting of a nicotine component, a botanical, a stimulant, a nutraceutical, an amino acid, a vitamin, a cannabinoid, and combinations thereof. In particular embodiments, the active ingredient comprises nicotine. In particular embodiments, the active ingredient comprises caffeine. The flavorant can vary and, in some embodiments, can be selected from the group consisting of ethyl vanillin, cinnamaldehyde, sabinene, limonene, gamma-terpinene, beta-farnesene, and citral.

The disclosure further provides, in another aspect, a method of delivering one or more flavoring agents and/or one or more active ingredients, comprising providing the one or more flavoring agents and/or one or more active ingredients in the form of a foamed component and/or an encapsulated component.

The disclosure includes, without limitations, the following embodiments.

Embodiment 1: A composition, comprising: a foam comprising a lipid and a component selected from the group consisting of an active agent, a flavorant, and combinations thereof and a carrier, wherein the foam is adsorbed onto the carrier.

Embodiment 2: The composition of Embodiment 1, wherein the carrier is microcrystalline cellulose.

Embodiment 3: The composition of any of Embodiments 1-2, wherein the microcrystalline cellulose is in particulate form.

Embodiment 4: The composition of any of Embodiments 1-3, wherein the active agent is selected from the group consisting of a nicotine component, a botanical, a stimulant, a nutraceutical, an amino acid, a vitamin, a cannabinoid, a cannabimimetic, a terpene, and combinations thereof.

Embodiment 5: The composition of any of Embodiments 1-4, wherein the active agent comprises nicotine.

Embodiment 6: The composition of any of Embodiments 1-5, wherein the active agent comprises caffeine.

Embodiment 7: An oral product comprising the composition of any of Embodiments 1-6.

Embodiment 8: The oral product of Embodiment 7, in the form of a lozenge.

Embodiment 9: The oral product of any of Embodiments 7-8, in the form of an oral product comprising a material within a porous pouch.

Embodiment 10: The oral product of any of Embodiments 7-9, wherein the material within the porous composition comprises the composition.

Embodiment 11: An oral product comprising an encapsulated agent, wherein the encapsulated agent comprises: a porous bead comprising an exterior portion and an interior portion comprising a lipid and a component selected from the group consisting of an active agent, a flavorant, and combinations thereof.

Embodiment 12: The oral product of Embodiment 11, wherein the active agent is selected from the group consisting of a nicotine component, a botanical, a stimulant, a nutraceutical, an amino acid, a vitamin, a cannabinoid, a cannabimimetic, a terpene, and combinations thereof.

Embodiment 13: The oral product of any of Embodiments 11-12, wherein the active agent comprises nicotine.

Embodiment 14: The oral product of any of Embodiments 11-13, wherein the active agent comprises caffeine.

Embodiment 15: The oral product of any of Embodiments 11-14, wherein the exterior portion comprises starch alginate.

Embodiment 16: The oral product of any of Embodiments 11-15, in the form of a lozenge.

Embodiment 17: The oral product of any of Embodiments 11-16, in the form of an oral pouched product comprising a material within a porous pouch.

Embodiment 18: The oral product of any of Embodiments 11-17, wherein the material comprises the encapsulated agent.

Embodiment 19: The oral product of any of Embodiments 11-18, wherein the porous pouch material comprises a fleece, and wherein the encapsulated agent is associated with the fleece.

Embodiment 20: The oral product of any of Embodiments 11-15, wherein the encapsulated agent is imbedded in the fleece.

Embodiment 21: The oral product of any of Embodiments 1-20, wherein the oral product is substantially free of tobacco material, other than nicotine, where present.

Embodiment 22: Use of the oral product of any of Embodiments 1-21 for the delivery of flavorants and/or active agents.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise.

BRIEF DESCRIPTION OF THE DRAWINGS

Having thus described aspects of the disclosure in the foregoing general terms, reference will now be made to the accompanying drawings, which are not necessarily drawn to scale. The drawings are exemplary only, and should not be construed as limiting the disclosure.

Figure 1:
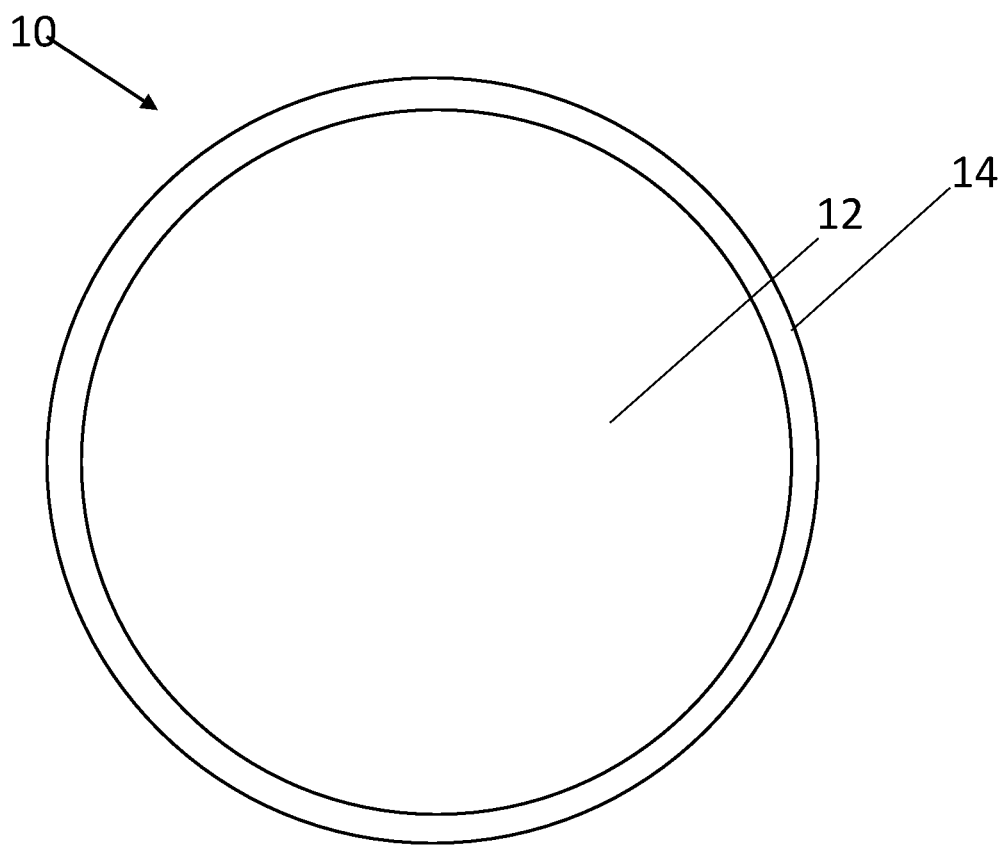
Figure 2:
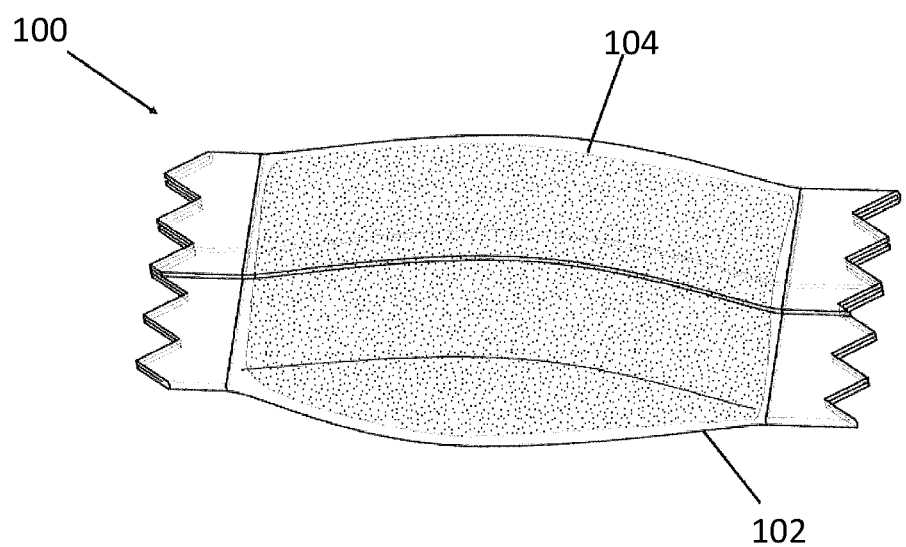

FIG. 1 is a view of one embodiment of a capsule comprising a flavorant and/or active ingredient as provided herein; and FIG. 2 is a perspective view of a pouched product according to an example embodiment of the present disclosure, including a pouch or fleece at least partially filled with a composition for oral use.

DETAILED DESCRIPTION

The present disclosure provides compositions for use as or inclusion within oral products, as well as products including such compositions with modified flavor and/or sensory characteristics. The disclosure additionally provides methods of making and methods of using such compositions and products.

The present disclosure will now be described more fully hereinafter with reference to example embodiments thereof. These example embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in this specification and the claims, the singular forms "a," "an," and "the" include plural referents unless the context clearly dictates otherwise. Reference to "dry weight percent" or "dry weight basis" refers to weight on the basis of dry ingredients (i.e., all ingredients except water). Reference to "wet weight" refers to the weight of the mixture including water. Unless otherwise indicated, reference to "weight percent" of a mixture reflects the total wet weight of the mixture (i.e., including water).

The disclosure generally provides products configured for oral use. The term "configured for oral use" as used herein means that the product is provided in a form such that during use, saliva in the mouth of the user causes one or more of the components of the mixture (e.g., flavoring agents and/or active ingredient(s)) to pass into the mouth of the user. In certain embodiments, the product is adapted to deliver components to a user through mucous membranes in the user's mouth and, in some instances, said component is an active ingredient (including, but not limited to, for example, nicotine) that can be absorbed through the mucous membranes in the mouth when the product is used.

Foamed components, encapsulated components, and products including such components are provided herein. The disclosure herein below describes the composition of foamed components and the composition of encapsulated components. These components can, in some embodiments, be directly employed as oral products. In other embodiments, these components are incorporated within a product, e.g., an oral product. Such oral products include, but are not limited to, oral pouched products, lozenges, pastilles, extrudates, gels, and the like.

Foamed Component

In various embodiments, foamed components are provided. A foamed component generally comprises an aqueous phase and a gaseous (air) phase. Foams typically have a unique light texture and/or different mouthfeel because of tiny air bubbles trapped therein. A foamed component as provided herein generally comprises a lipid and an active agent, flavorant, or combination thereof. A foamed component commonly further comprises a humectant and water. Although not intending to be limited thereto, in certain embodiments, the foam is adsorbed onto a carrier. The disclosed foams can have varying physical properties (e.g., percent volume void space, density, pore size, and the like). Foams can have various textures and can range from, e.g., highly foamed (airy) materials to gel-like materials and cream-like materials and all such materials are intended to be encompassed within the present disclosure.

The lipid of the foams provided herein can vary. In some embodiments, the lipid comprises an oil and, in particular, a food grade oil including fractionated oils. Such oils include, but are not limited to, vegetable oils (e.g., acai oil, almond oil, amaranth oil, apricot oil, apple seed oil, argan oil, avocado oil, babassu oil, beech nut oil, ben oil, bitter gourd oil, black seed oil, blackcurrant seed oil, borage seed oil, borneo tallow nut oil, bottle gourd oil, brazil nut oil, buffalo gourd oil, butternut squash seed oil, cape chestnut oil, canola oil, carob cashew oil, cocoa butter, cocklebur oil, coconut oil, corn oil, cothune oil, coriander seed oil, cottonseed oil, date seed oil, dika oil, egus seed oil, evening primrose oil, false flax oil, flaxseed oil, grape seed oil, grapefruit seed oil, hazelnut oil, hemp oil, kapok seed oil, kenaf seed oil, lallemantia oil, lemon oil, linseed oil, macadamia oil, mafura oil, manila oil, meadowfoam seed oil, mongongo nut oil, mustard oil, niger seed oil, nutmeg butter, okra seed oil, olive oil, orange oil, palm oil, papaya seed oil, peanut oil, pecan oil, perilla seed oil, persimmon seed oil, pequi oil, pili nut oil, pine nut oil, pistachio oil, pomegranate seed oil, poppyseed oil, pracaxi oil, prune kernel oil, pumpkin seed oil, quinoa oil, ramtil oil, rapeseed oil, rice bran oil, royle oil, sacha inchi oil, safflower oil, sapote oil, seje oil, sesame oil, shea butter, soybean oil, sunflower oil, taramira oil, tea seed oil, thistle oil, tigernut oil, tobacco seed oil, tomato seed oil, walnut oil, watermelon seed oil, wheat germ oil, and combinations thereof), animal oils (e.g., cattle fat, buffalo fat, sheep fat, goat fat, pig fat, lard, camel fat, tallow, liquid margarine, fish oil, fish liver oil, whale oil, seal oil, and combinations thereof), and mineral oils.

In certain embodiments, the lipid of the foamed component of the present disclosure include palm oil (including fractionated palm oil), palm kernel oil, soybean oil, sunflower oil, cottonseed oil, coconut oil, and mixtures thereof, where the oil may be hydrogenated, partially hydrogenated, or non-hydrogenated. In one embodiment, the lipid is a blend of palm oil and palm kernel oil. Example embodiments of lipids can be purchased under the brand names CEBES®, CISAO®, or CONFAO®, available from AarhusKarlshamn USA Inc.

The disclosed foamed components generally comprise an active ingredient and/or flavorant. These components can vary, as provided herein below. In some embodiments, a foam comprises a single active ingredient and in other embodiments, a foam comprises two or more active ingredients. In some embodiments, a foam comprises a single flavorant and in other embodiments, a foam comprises two or more flavorants. In some embodiments, a foam comprises an active ingredient and a flavorant.

Foamed components typically comprise one or more humectants. Examples of humectants include, but are not limited to, glycerin, propylene glycol, lecithin, gelatin, flax seed gel (linseed), okra gel, aloe vera, hydroxyethylcellulose, pectin, xanthan gum, guar gum, agar agar, methyl cellulose, locust bean gum, marshmallow root, slippery elm, carrageenan, nettle leaf tea, nettle extract, panthenol, hydrolyzed protein, peptides, amino acids, cocodimonium hydroxypropyl hydrolyzed protein, cocyl hydrolyzed protein, potassium cocoyl hydrolyzed protein, hydrolyzed oat flour, and the like. A humectant can be used in a sufficient amount to provide, e.g., foam stability, foam moisture, foam formability/flowability, and the like. When present, a humectant will typically make up about 10% or less or 5% or less of the weight of the foamed component (e.g., from about 0.5 to about 10% by weight). When present, a representative amount of humectant is about 0.1% to about 1% by weight, or about 1% to about 5% by weight, based on the total weight of the foamed component. Foams can also optionally comprise a propellant. A propellant is a material that is gaseous under atmospheric pressures and liquefied when compressed. Common propellants include, but are not limited to, propane, butane, isobutene, and mixtures thereof (e.g., propane-butane and propane-isobutane), as well as nitrogen, carbon dioxide, and fluorocarbons. Typically, a propellant is provided in an amount sufficient to produce a stable foam.

In some embodiments, the foams provided herein can optionally further comprise various additional components, e.g., including, but not limited to, texturizing agents (e.g., to modify mouthfeel, e.g., particulate materials that are insoluble in oil, which take up moisture, such as sucrose, dextrose, fructose, corn syrup, sugar alcohols (e.g., sorbitol, manitol, xylitol), maltodextrin, polydestrose, various dextrins, and the like), preservatives (e.g., benzoic acid, sorbic acid, methylparaben, propylparaben, di-alpha tocopherol, BHT, ethylene-diaminetetracetic acid, etc.), colorants, sweeteners (e.g., aspartame, saccharin, etc.), humectants, and combinations of any two or more thereof.

The foams generally further comprise water, e.g., distilled water. The amount of water can vary and may be, e.g., a suitable amount to ensure the production of a foam. The viscosity of the disclosed foams can vary and can be modified accordingly by one of skill in the art, e.g., by adjusting the processing/preparation conditions, the components of the foam, and/or the amounts of the various components of the foam.

Foams as provided herein can be used directly as an oral product for the delivery of the active agent and/or flavorant as described. Foams as provided herein can alternatively be incorporated within various products in some embodiments. In some embodiments, foamed components can be adsorbed onto a carrier and the carrier comprising the foam is incorporated within a product. The type of carrier, where employed, can vary and a range of types of carriers are known and can be used to adsorb the foams of the present disclosure. Examples of solid carriers include, but are not limited to, silica gel, fumed silica, precipitated silica, dicalcium phosphate anhydrous, ethylene vinyl acetate, polypropylene, titanium dioxide, magnesium aluminum silicate, talc, microcrystalline cellulose (MCC), sugars (e.g., isomaltose) and the like.

In certain embodiments, the carrier comprises MCC. MCC can be provided with various physical properties and can be selected based on, e.g., porosity, particle size, moisture content, etc. MCC is generally available as a powdered MCC (spray dried product) or as a colloidal MCC. MCC can be provided, e.g., in the form of spherical (or substantially spherical) particles, irregular particles, or rod-shaped particles. These particles can range in size, e.g., with mesh sizes of 70-140 mesh, 45-70 mesh, 35-45 mesh, 25-35 mesh, 18-25 mesh, or 14-18 mesh. In some embodiments, MCC particles are employed with an average particle size of about 25 microns to about 100 microns, about 25 microns to about 50 microns, about 50 microns to about 200 microns, about 50 microns to about 100 microns, or about 150 microns to about 200 microns. Certain commercially available MCC materials can be used, e.g., including, but not limited to, PH 101, PH 102, PH 103, PH 105, PH 112, PH 113, PH 200, and PH 301.

Foamed components as provided herein can be produced in any manner by which foams are made. For example, in some embodiments, one or more of the components of the foamed component is stirred/whipped/mixed/shaken to provide the one or more components in a "foamed" form (including gas bubbles within). Typically, the humectant is required to allow the foam to form and is thus included during the production of the foam. The active agent and/or flavorant can be added prior to or during the stirring/whipping/mixing/shaking or can be added once the foam is formed, e.g., by stirring/mixing the active agent and/or flavorant into a formed foam. In some embodiments, foams can be formed through the use of propellants, e.g., by passing a mixture through a canister equipped with a nitrous oxide cartridge.

In some embodiments, providing a flavorant and/or active agent in the form of a foam as described herein allows for controlled release of such a component. For example, a foam can advantageously provide a controlled/extended release form of the flavorant and/or active agent. Such controlled/extended release profile can vary. In some embodiments, the flavorant(s) and/or active agent(s) are not released substantially immediately upon placing the foam within a user's mouth. In some embodiments, the flavorant(s) and/or active agent(s) begins being released into the user's mouth about 30 seconds or more after being placed into the user's mouth, about 45 seconds or more after being placed into the user's mouth, about 1 minute or more after being placed into the user's mouth, or about 2 minutes or more after being placed into the user's mouth. In some embodiments, the flavorant(s) and/or active agent(s) is released, in part, substantially immediately upon placing the foam within a user's mouth, and the remainder of the flavorant and/or active agent is released into the user's mouth over a period lasting, e.g., about 1 minute or more, about 2 minutes or more, about 5 minutes or more, about 10 minutes or more, about 15 minutes or more.

As will be provided herein below, the disclosed foams can be employed in various manners. For example, in some embodiments, such foams are directly used to deliver flavorants and/or active agents to a user's oral cavity. In other embodiments, such foams are incorporated within other types of oral products. Such oral products include, e.g., pouched products and lozenges. In some embodiments, inclusion of the disclosed foams within a smokeless tobacco product can provide for even further extended release of the active agent(s) or flavorant(s) associated therewith. Release properties can thus be further varied, e.g., by the size and/or other components of the oral product. For example, inclusion of a foamed component within a smaller oral product may provide faster release than inclusion of that foamed component within a larger oral product. The foamed components provided herein can be incorporated within such products in varying amounts. Further components and detail regarding such products is provided herein below.

Encapsulated Components

In various embodiments, an encapsulated component is provided herein. A schematic of an encapsulated component 10 is provided in FIG. 1. An encapsulated component is understood to comprise a core ingredient (12) coated with a shell material, 14 (also referred to as a wall material, carrier, or encapsulant).

The shell material 14 can vary and can be selected from various materials known for the encapsulation of ingredients. Certain exemplary shell materials that can be used in embodiments of the present disclosure include, but are not limited to, proteins, carbohydrates (e.g., polysaccharides), lipids, gums, cellulose, and combinations thereof. Specific compositions can be, for example, maltodextrin, corn syrup, modified starch, gum arabic, modified cellulose, gelatin, cyclodextrin, lecithin, whey protein, hydrogenated fat, and the like. One example of a shell material 14 that can be employed in certain embodiments of the disclosure is starch alginate. The choice of shell material can depend upon a number of different factors including, but not limited to, compatibility with the core ingredient; (e.g., to ensure little/no reactivity therewith and to ensure an effective barrier for volatile core ingredients) desired features of the final encapsulated component; and the process to be used to encapsulate the core ingredient. The shell can be of uniform or non-uniform thickness.

The core ingredient 12 can typically comprise a flavorant and/or an active agent. The core ingredient 12 can, in some embodiments, comprise only the flavorant and/or active agent. In other embodiments, one or more additional components can be included within the core ingredient, e.g., diluents, lipids, and the like. In some embodiment, a lipid as referenced herein above (e.g., an oil, such as a food grade oil) is included as a component of core ingredient 12. In some embodiments, the exact types and amounts of components, and ratios of components can vary, e.g., to provide an encapsulated component with the desired properties. In some embodiments, the core ingredient comprises the flavorant or active agent in an amount of about 1% to about 20% by weight. For example, a flavorant is commonly incorporated in an amount of at least about 10% by weight, e.g., at least about 15% by weight, or at least about 20% by weight (e.g., about 15% to about 25% by weight) of the encapsulated component. An active agent is provided in an amount that can vary depending on the composition of the active agent(s) and can be in the non-limiting range of about 0.1% to about 10% by weight of the encapsulated component.

Core ingredients can be effectively encapsulated within shell material 14 by any known method. Methods for the encapsulation of core ingredients that can be employed according to the present disclosure include, but are not limited to, chemical processes (e.g., coacervation, co-crystallization, molecular inclusion, interfacial polymerization) and mechanical processes (e.g., spray drying, spray chilling/cooling, extrusion, and fluidized bed techniques).

In some embodiments, providing a flavorant and/or active agent in the form of an encapsulated agent as described herein allows for controlled release of such a component. For example, an encapsulated agent can advantageously provide a controlled/extended release form of the flavorant and/or active agent. Such controlled/extended release profile can vary. In some embodiments, the flavorant(s) and/or active agent(s) are not released substantially immediately upon placing the encapsulated agent within a user's mouth. In some embodiments, the flavorant(s) and/or active agent(s) begins being released into the user's mouth about 30 seconds or more after being placed into the user's mouth, about 45 seconds or more after being placed into the user's mouth, about 1 minute or more after being placed into the user's mouth, or about 2 minutes or more after being placed into the user's mouth. The rate of release can, in some embodiments, be modified by adjusting the composition of the shell, the thickness of the shell, etc.). In some embodiments, the flavorant(s) and/or active agent(s) is released, in part, substantially immediately upon placing the encapsulated agent within a user's mouth, and the remainder of the flavorant and/or active agent is released into the user's mouth over a period lasting, e.g., about 1 minute or more, about 2 minutes or more, about 5 minutes or more, about 10 minutes or more, about 15 minutes or more.

As will be provided herein below, the disclosed encapsulated component can be employed in various manners. For example, in some embodiments, such encapsulated components are directly used to deliver flavorants and/or active ingredients to a user's oral cavity. In other embodiments, such encapsulated components are incorporated within other types of products. Such products include, e.g., pouched products and lozenges. The encapsulated components provided herein can be incorporated within such products in varying amounts. Further components and detail regarding such products is provided herein below.

Pouched Products

As referenced, in some embodiments, a foamed component or encapsulated component as described herein is incorporated within an oral pouched product. Foamed components can be directly incorporated into the product as a foam or can be incorporated into the product as a foam associated with a carrier (e.g., MCC), as referenced herein above. References herein below to products incorporating a foamed component include product incorporating a foam and products incorporating a carrier comprising a foamed component.

The foamed or encapsulated components can be incorporated within a pouched product along with other components, in the form of a mixture of one or more components, disposed within a moisture-permeable container (e.g., a water-permeable pouch). In some embodiments, the weight of the mixture within each pouch is at least about 50 mg, for example, from about 50 mg to about 2 grams, from about 100 mg to about 1.5 grams, or from about 200 to about 700 mg.

Such mixtures in the water-permeable pouch format are typically used by placing a pouch containing the mixture in the mouth of a human subject/user. Generally, the pouch is placed somewhere in the oral cavity of the user, for example under the lips, in the same way as moist snuff products are generally used. The pouch preferably is not swallowed. Exposure to saliva then causes some of the components of the mixture therein (e.g., flavoring agents and/or active ingredient) to pass through e.g., the water-permeable pouch and provide the user with flavor and satisfaction, and the user is not required to spit out any portion of the mixture. After about 10 minutes to about 60 minutes, typically about 15 minutes to about 45 minutes, of use/enjoyment, substantial amounts of the mixture have been absorbed through oral mucosa of the human subject, and the pouch may be removed from the mouth of the consumer for disposal.

In other embodiments, the foamed or encapsulated components can be incorporated within a pouched product in the form of a material associated with the outer fleece of the pouch, rather than being contained within the pouch. The means by which the foamed or encapsulated components can be "associated with" the fleece can vary. For example, in some embodiments, the fleece can be coated with the foamed or encapsulated components (giving such components on the inside or outside of the pouched product). In some embodiments, the foamed or encapsulated components can be imbedded within the fleece, which can be done during production of the fleece or after production of the fleece. Certain embodiments of the disclosure will be described with reference to the figures of the accompanying drawings, and these described embodiments involve snus-type products having an outer pouch and containing a mixture of components (as referenced herein below). The pouched product 100 includes a moisture-permeable container in the form of a pouch 102, which contains a material 104 comprising a mixture of components. As explained in greater detail below, such embodiments are provided by way of example only. In particular, the size and shape of the illustrated outer pouches can vary as described in detail herein. The mixture/construction of such packets or pouches, such as the container pouch 102 in the embodiment illustrated in the figures, may be varied.

Suitable materials for the packets, pouches or containers of the type used for the manufacture of smokeless tobacco products are available under the tradenames CatchDry, Ettan, General, Granit, Goteborgs Rape, Grovsnus White, Metropol Kaktus, Mocca Anis, Mocca Mint, Mocca Wintergreen, Kicks, Probe, Prince, Skruf and TreAnkrare. The mixture may be contained in pouches and packaged, in a manner and using the types of components used for the manufacture of conventional snus types of products. The pouch is typically a porous pouch, which is a liquid-permeable container of a type that may be considered to be similar in character to the mesh-like type of material that is used for the construction of a tea bag. Components of the mixture readily diffuse through the pouch and into the mouth of the user. Non-limiting examples of pouches are set forth in, for example, U.S. Pat. No. 5,167,244 to Kjerstad and 8,931,493 to Sebastian et al.; as well as U.S. Patent App. Pub. Nos. 2016/0000140 to Sebastian et al.; 2016/0073689 to Sebastian et al.; 2016/0157515 to Chapman et al.; and 2016/0192703 to Sebastian et al., each of which are incorporated herein by reference. As provided herein, such example pouches are considered herein to be "conventional" products, which are provided as comparisons to the pouches disclosed herein, which exhibit various modifications with respect to one or more such conventional products. Pouches can be provided as individual pouches, or a plurality of pouches (e.g., 2, 4, 5, 10, 12, 15, 20, 25 or 30 pouches) can be connected or linked together (e.g., in an end-to-end manner) such that a single pouch or individual portion can be readily removed for use from a one-piece strand or matrix of pouches.

An example pouch may be manufactured from materials, and in such a manner, such that during use by the user, the pouch undergoes a controlled dispersion or dissolution. Such pouch materials may have the form of a mesh, screen, perforated paper, permeable fabric, or the like. For example, pouch material manufactured from a mesh-like form of rice paper, or perforated rice paper, may dissolve in the mouth of the user. As a result, the pouch and mixture each may undergo complete dispersion within the mouth of the user during normal conditions of use, and hence the pouch and mixture both may be ingested by the user. Other examples of pouch materials may be manufactured using water dispersible film forming materials (e.g., binding agents such as alginates, carboxymethylcellulose, xanthan gum, pullulan, and the like), as well as those materials in combination with materials such as ground cellulosics (e.g., fine particle size wood pulp). Preferred pouch materials, though water dispersible or dissolvable, may be designed and manufactured such that under conditions of normal use, a significant amount of the mixture contents permeate through the pouch material prior to the time that the pouch undergoes loss of its physical integrity. If desired, flavoring ingredients, disintegration aids, and other desired components, may be incorporated within, or applied to, the pouch material.

In some embodiments, features such as the location of the foamed component or encapsulated component within the oral pouched product and the amount of the foamed component or encapsulated component within the oral pouched product can be varied so as to provide the desired amount and rate of release of the active agent and/or flavorant from the oral pouched product. For example, by embedding a foamed component or encapsulated component on the interior of an oral pouched product, the active agent and/or flavorant must be released from the foam component and/or shell of the encapsulated component, and must further dissipate through the fleece outer component of the oral pouched product to reach the user's oral cavity. As such, inclusion of active agents and/or flavorants in the disclosed foamed or encapsulated form can further extend the release time associated with the active agents and/or flavorants. This extended release can be used in tailoring products, e.g., so as to provide one flavorant for more immediate release in another form (i.e., not encapsulated or foamed), and one flavorant for slower and/or more extended release in encapsulated or foamed form.

Foamed components and encapsulated components can be incorporated within pouched products by any means and at any stage of a conventional pouch production process. Manufacturing apparatus and methods that can be adapted for preparation of the pouches according to the present disclosure include, e.g., those disclosed in U.S. Patent Application Publication No. 2012/0055493 to Novak, III et al., incorporated herein by reference in its entirety, relates to an apparatus and process for providing pouch material formed into a tube for use in the manufacture of smokeless tobacco products. Similar apparatuses that incorporate equipment for supplying a continuous supply of a pouch material (e.g., a pouch processing unit adapted to supply a pouch material to a continuous tube forming unit for forming a continuous tubular member from the pouch material) can be used to create a pouched product described herein. Representative equipment for forming such a continuous tube of pouch material is disclosed, for example, in U.S. Patent Application Publication No. U.S. 2010/0101588 to Boldrini et al., which is incorporated herein by reference in its entirety. The apparatus further includes equipment for supplying pouched material to the continuous tubular member such that, when the continuous tubular member is subdivided and sealed into discrete pouch portions, each pouch portion includes a charge of a composition adapted for oral use (which advantageously can incorporate an encapsulated component and/or foamed component as provided herein). Representative equipment for supplying the filler material is disclosed, for example, in U.S. Patent Application Publication No. U.S. 2010/0018539 to Brinkley, which is incorporated herein by reference in its entirety. In some instances, the apparatus may include a subdividing unit for subdividing the continuous tubular member into individual pouch portions and, once subdivided into the individual pouch portions, may also include a sealing unit for sealing at least one of the ends of each pouch portion. In other instances, the continuous tubular member may be sealed into individual pouch portions with a sealing unit and then, once the individual pouch portions are sealed, the continuous tubular member may be subdivided into discrete individual pouch portions by a subdividing unit subdividing the continuous tubular member between the sealed ends of serially-disposed pouch portions. Still in other instances, sealing (closing) of the individual pouch portions of the continuous tubular member may occur substantially concurrently with the subdivision thereof, using a closing and dividing unit.

An example apparatus for manufacturing an oral pouch product, which, again, may be suitably modified as needed to produce the disclosed nano pouches, is illustrated in FIGS. 1-5 of U.S. Publication No. 2012/0055493 to Novak, III et al.; however, this apparatus is used in a generic and descriptive sense only and not for purposes of limitation. It should also be appreciated that the following manufacturing process and related equipment is not limited to the process order described below. In various embodiments of the present invention, an apparatus similar to that described in U.S. Patent Application Publication No. 2012/0055493 can be configured to removably receive a first bobbin on an unwind spindle assembly, the first bobbin having a continuous length of a material, such as a pouch material, wound thereon.

When the first bobbin is engaged with the apparatus, the pouch material can be routed from the first bobbin to a forming unit configured to form a continuous supply of the pouch material into a continuous tubular member defining a longitudinal axis.

As such, as the pouch material is unwound from the first bobbin, the pouch material can be directed around an arrangement of roller members, otherwise referred to herein as a dancer assembly. A forming unit can be configured to cooperate with the first bobbin and the dancer assembly to take up slack in the pouch material and to maintain a certain amount of longitudinal tension on the pouch material as the pouch material is unwound from the first bobbin and fed to the forming unit, for example, by a drive system. One of ordinary skill in the art will appreciate that, between the first bobbin and the forming unit, the pouch material can be supported, routed, and/or guided by a suitably aligned series of any number of, for example, idler rollers, guideposts, air bars, turning bars, guides, tracks, tunnels, or the like, for directing the pouch material along the desired path. Typical bobbins used by conventional automated pouch making apparatuses often contain a continuous strip of pouch material of which the length may vary. As such, the apparatus described herein can be configured so as to handle bobbins of that type and size.

The forming unit can include one or more roller members configured to direct the pouch material about a hollow shaft such that the continuous supply of the pouch material can be formed into a continuous tubular member. The forming unit can include a sealing device configured to seal, fix, or otherwise engage lateral edges of the pouch material to form a longitudinally-extending seam, thereby forming a longitudinally-extending continuous tubular member. In various embodiments, an insertion unit can be configured to introduce charges of the composition adapted for oral use (including the disclosed encapsulated component and/or foamed component) into the continuous tubular member through the hollow shaft. The insertion unit may be directly or indirectly engaged with the hollow shaft.

A leading edge or end (also referred to as a laterally-extending seam) of the continuous tubular member can be closed/sealed such that a charge of composition adapted for oral use (comprising the disclosed encapsulated and/or foamed component) inserted by the insertion unit, is contained within the continuous tubular member proximate to the leading end. The leading end can be closed/sealed via a closing and dividing unit configured to close/seal a first portion of the continuous tubular member to form the closed leading end of a pouch member portion. The closing and dividing unit can also be configured to form a closed trailing edge or end of a previous pouch member portion. In this regard, the closing and dividing unit can also be configured to close a second portion of the continuous tubular member to form the closed trailing end of the pouch member portion. In this regard, the closing and dividing unit can close the ends, by heat-sealing, or other suitable sealing mechanism.

As illustrated in FIGS. 20-22 of U.S. Publication No. 2012/0055493 to Novak, III et al., the closing and dividing unit can be configured to divide the continuous tubular member, between the closed trailing end and the closed leading end of serially-disposed pouch member portions, along the longitudinal axis of the continuous tubular member, and into a plurality of discrete pouch member portions such that each discrete pouch member portion includes a portion of the oral composition from the insertion unit. In this regard, the closing and dividing unit can include a blade, heated wire, or other cutting arrangement for severing the continuous tubular member into discrete pouch member portions. For example, the closing and dividing unit can include first and second arm members configured to interact to close and divide the continuous tubular member.

In operation, a charge of the composition adapted for oral use (i.e., an amount suitable for an individual pouch member portion) can be supplied to the pouch member portion by an insertion unit after a leading end has been closed, but prior to the closing of a trailing end. In various embodiments, after receiving the charge of the oral composition, the discrete individual pouch member portion can be formed by closing the trailing end and severing the closed pouch member portion from the continuous tubular member such that an individual pouched product is formed.

Pouched products generally comprise, in addition to the pouch-based exterior, a mixture within the pouch that typically comprises one or more active ingredients and/or one or more flavorants (wherein one or both can be provided in encapsulated and/or foamed form as described herein), and various other optional ingredients. The composition of the material within the pouches provided herein is not particularly limited (other than comprising the referenced encapsulated and/or foamed component), and can comprise any filling composition, including those included within conventional pouched produces. Such compositions are generally mixtures of two or more components and as such, the compositions are, in some cases, referenced herein below as "mixtures." Certain components that can advantageously be included in the mixtures within certain embodiments of the pouches provided herein are outlined generally below; however, it is to be understood that the discussion below is not intended to be limiting of the components that can be incorporated within the disclosed pouches.

Filler

The material within the pouches as described herein typically includes at least one particulate filler. Such particulate filler components may fulfill multiple functions, such as enhancing certain organoleptic properties such as texture and mouthfeel, enhancing cohesiveness or compressibility of the product, and the like. Generally, the filler components are porous particulate materials and are cellulose-based. For example, suitable particulate filler components are any non-tobacco plant material or derivative thereof, including cellulose materials derived from such sources. Examples of cellulosic non-tobacco plant material include cereal grains (e.g., maize, oat, barley, rye, buckwheat, and the like), sugar beet (e.g., FIBREX® brand filler available from International Fiber Corporation), bran fiber, and mixtures thereof. Non-limiting examples of derivatives of non-tobacco plant material include starches (e.g., from potato, wheat, rice, corn), natural cellulose, and modified cellulosic materials. Additional examples of potential particulate filler components include maltodextrin, dextrose, calcium carbonate, calcium phosphate, lactose, mannitol, xylitol, and sorbitol. Combinations of fillers can also be used.

"Starch" as used herein may refer to pure starch from any source, modified starch, or starch derivatives. Starch is present, typically in granular form, in almost all green plants and in various types of plant tissues and organs (e.g., seeds, leaves, rhizomes, roots, tubers, shoots, fruits, grains, and stems). Starch can vary in composition, as well as in granular shape and size. Often, starch from different sources has different chemical and physical characteristics. A specific starch can be selected for inclusion in the mixture based on the ability of the starch material to impart a specific organoleptic property to composition. Starches derived from various sources can be used. For example, major sources of starch include cereal grains (e.g., rice, wheat, and maize) and root vegetables (e.g., potatoes and cassava). Other examples of sources of starch include acorns, arrowroot, arracacha, bananas, barley, beans (e.g., favas, lentils, mung beans, peas, chickpeas), breadfruit, buckwheat, canna, chestnuts, colacasia, katakuri, kudzu, malanga, millet, oats, oca, Polynesian arrowroot, sago, sorghum, sweet potato, quinoa, rye, tapioca, taro, tobacco, water chestnuts, and yams. Certain starches are modified starches. A modified starch has undergone one or more structural modifications, often designed to alter its high heat properties. Some starches have been developed by genetic modifications, and are considered to be "genetically modified" starches. Other starches are obtained and subsequently modified by chemical, enzymatic, or physical means. For example, modified starches can be starches that have been subjected to chemical reactions, such as esterification, etherification, oxidation, depolymerization (thinning) by acid catalysis or oxidation in the presence of base, bleaching, transglycosylation and depolymerization (e.g., dextrinization in the presence of a catalyst), cross-linking, acetylation, hydroxypropylation, and/or partial hydrolysis. Enzymatic treatment includes subjecting native starches to enzyme isolates or concentrates, microbial enzymes, and/or enzymes native to plant materials, e.g., amylase present in corn kernels to modify corn starch. Other starches are modified by heat treatments, such as pregelatinization, dextrinization, and/or cold water swelling processes. Certain modified starches include monostarch phosphate, distarch glycerol, distarch phosphate esterified with sodium trimetaphosphate, phosphate distarch phosphate, acetylated distarch phosphate, starch acetate esterified with acetic anhydride, starch acetate esterified with vinyl acetate, acetylated distarch adipate, acetylated distarch glycerol, hydroxypropyl starch, hydroxypropyl distarch glycerol, starch sodium octenyl succinate.

In some embodiments, the particulate filler component is a cellulose material or cellulose derivative. One particularly suitable particulate filler component for use in the products described herein is microcrystalline cellulose ("MCC"). The MCC may be synthetic or semi-synthetic, or it may be obtained entirely from natural celluloses. The MCC may be selected from the group consisting of AVICEL® grades PH-100, PH-102, PH-103, PH-105, PH-112, PH-113, PH-200, PH-300, PH-302, VIVACEL® grades 101, 102, 12, 20 and EMOCEL® grades 50M and 90M, and the like, and mixtures thereof. In one embodiment, the mixture comprises MCC as the particulate filler component. The quantity of MCC present in the mixture as described herein may vary according to the desired properties.

The amount of particulate filler component can vary, but is typically up to about 75 percent of the material contained within the pouch by weight (i.e., the mixture), based on the total weight of the mixture. A typical range of particulate filler material (e.g., MCC) within the mixture can be from about 10 to about 75 percent by total weight of the mixture, for example, from about 10, about 15, about 20, about 25, or about 30, to about 35, about 40, about 45, or about 50 weight percent (e.g., about 20 to about 50 weight percent or about 25 to about 45 weight percent). In certain embodiments, the amount of particulate filler material is at least about 10 percent by weight, such as at least about 20 percent, or at least about 25 percent, or at least about 30 percent, or at least about 35 percent, or at least about 40 percent, based on the total weight of the mixture.

In one embodiment, the particulate filler component further comprises a cellulose derivative or a combination of such derivatives. In some embodiments, the mixture comprises from about 1 to about 10% of the cellulose derivative by weight, based on the total weight of the mixture, with certain embodiments comprising about 1 to about 5% by weight of cellulose derivative. In certain embodiments, the cellulose derivative is a cellulose ether (including carboxyalkyl ethers), meaning a cellulose polymer with the hydrogen of one or more hydroxyl groups in the cellulose structure replaced with an alkyl, hydroxyalkyl, or aryl group. Non-limiting examples of such cellulose derivatives include methylcellulose, hydroxypropylcellulose ("HPC"), hydroxypropylmethylcellulose ("HPMC"), hydroxyethyl cellulose, and carboxymethylcellulose ("CMC"). In one embodiment, the cellulose derivative is one or more of methylcellulose, HPC, HPMC, hydroxyethyl cellulose, and CMC. In one embodiment, the cellulose derivative is HPC. In some embodiments, the mixture comprises from about 1 to about 3% HPC by weight, based on the total weight of the mixture.

Water

The water content of the mixture within the pouched product described herein, prior to use by a consumer of the product, may vary according to the desired properties. Typically, the mixture, as present within the product prior to insertion into the mouth of the user, is less than about 60 percent by weight of water, and generally is from about 1 to about 60% by weight of water, for example, from about 5 to about 55, about 10 to about 50, about 20 to about 45, or about 25 to about 40 percent water by weight, including water amounts of at least about 5% by weight, at least about 10% by weight, at least about 15% by weight, and at least about 20% by weight.

Flavoring Agent

As used herein, a "flavoring agent" or "flavorant" is any flavorful or aromatic substance capable of altering the sensory characteristics associated with the oral product. Examples of sensory characteristics that can be modified by the flavoring agent include taste, mouthfeel, moistness, coolness/heat, and/or fragrance/aroma.

The flavorants described herein are employed, e.g., independently and/or in encapsulated and/or foamed form as provided herein. In some embodiments, all of the flavorants within a given product provided herein is in foamed or encapsulated form. In some embodiments, none of the flavorants within a given product is in foamed or encapsulated form. In further embodiments, some of the active agent within a given product is in foamed or encapsulated form (and some is provided independently).

Flavoring agents may be natural or synthetic, and the character of the flavors imparted thereby may be described, without limitation, as fresh, sweet, herbal, confectionary, floral, fruity, or spicy. Specific types of flavors include, but are not limited to, vanilla, coffee, chocolate/cocoa, cream, mint, spearmint, menthol, peppermint, wintergreen, eucalyptus, lavender, cardamon, nutmeg, cinnamon, clove, cascarilla, sandalwood, honey, jasmine, ginger, anise, sage, licorice, lemon, orange, apple, peach, lime, cherry, strawberry, and any combinations thereof. See also, Leffingwell et al., Tobacco Flavoring for Smoking Products, R. J. Reynolds Tobacco Company (1972), which is incorporated herein by reference. Flavorings also may include components that are considered moistening, cooling or smoothening agents, such as eucalyptus. These flavors may be provided neat (i.e., alone) or in a composite, and may be employed as concentrates or flavor packages (e.g., spearmint and menthol, orange and cinnamon; lime, pineapple, and the like). Representative types of components also are set forth in U.S.

Pat. No. 5,387,416 to White et al.; U.S. Pat. App. Pub. No. 2005/0244521 to Strickland et al.; and PCT Application Pub. No. WO 05/041699 to Quinter et al., each of which is incorporated herein by reference. In some instances, the flavoring agent may be provided in a spray-dried form or a liquid form.

The flavoring agent may comprise at least one volatile flavor component. As used herein, "volatile" refers to a chemical substance that forms a vapor readily at ambient temperatures (i.e., a chemical substance that has a high vapor pressure at a given temperature relative to a nonvolatile substance). Typically, a volatile flavor component has a molecular weight below about 400 Da, and often include at least one carbon-carbon double bond, carbon-oxygen double bond, or both. In one embodiment, the at least one volatile flavor component comprises one or more alcohols, aldehydes, aromatic hydrocarbons, ketones, esters, terpenes, terpenoids, trigeminal sensates, or a combination thereof. Non-limiting examples of aldehydes include vanillin, ethyl vanillin, p-anisaldehyde, hexanal, furfural, isovaleraldehyde, cuminaldehyde, benzaldehyde, and citronellal. Non-limiting examples of ketones include 1-hydroxy-2-propanone and 2-hydroxy-3-methyl-2-cyclopentenone-1-one. Non-limiting examples of esters include allyl hexanoate, ethyl heptanoate, ethyl hexanoate, isoamyl acetate, and 3-methylbutyl acetate. Non-limiting examples of terpenes include sabinene, limonene, gamma-terpinene, beta-farnesene, nerolidol, thujone, myrcene, geraniol, nerol, citronellol, linalool, and eucalyptol. In one embodiment, the at least one volatile flavor component comprises one or more of ethyl vanillin, cinnamaldehyde, sabinene, limonene, gamma-terpinene, beta-farnesene, or citral. In one embodiment, the at least one volatile flavor component comprises ethyl vanillin. The amount of flavoring agent utilized in the mixture can vary, but is typically up to about 10 weight percent, and certain embodiments are characterized by a flavoring agent content of at least about 0.1 weight percent, such as about 0.5 to about 10 weight percent, about 1 to about 6 weight percent, or about 2 to about 5 weight percent, based on the total weight of the mixture.

The amount of flavoring agent present within the mixture may vary over a period of time (e.g., during a period of storage after preparation of the mixture). For example, certain volatile components present in the mixture may evaporate or undergo chemical transformations, leading to a reduction in the concentration of one or more volatile flavor components. In one embodiment, a concentration of one or more of the at least one volatile flavor components present is greater than a concentration of the same one or more volatile flavor components present in a control pouched product which does not include the one or more organic acids, after the same time period. Without wishing to be bound by theory, it is believed that the same mechanisms responsible for loss of whiteness result in a gradual decline in certain volatile components in the flavoring (e.g., aldehydes, ketones, terpenes). Therefore, a decline in the presence of these volatile components leading to the discoloration over time may be expected to diminish the sensory satisfaction associated with products subject to such a degradation process.

Salts

In some embodiments, the mixture may further comprise a salt (e.g., alkali metal salts), typically employed in an amount sufficient to provide desired sensory attributes to the mixture. Non-limiting examples of suitable salts include sodium chloride, potassium chloride, ammonium chloride, flour salt, and the like. When present, a representative amount of salt is about 0.5 percent by weight or more, about 1.0 percent by weight or more, or at about 1.5 percent by weight or more, but will typically make up about 10 percent or less of the total weight of the mixture, or about 7.5 percent or less or about 5 percent or less (e.g., about 0.5 to about 5 percent by weight).

Sweeteners

The mixture typically further comprises one or more sweeteners. The sweeteners can be any sweetener or combination of sweeteners, in natural or artificial form, or as a combination of natural and artificial sweeteners. Examples of natural sweeteners include fructose, sucrose, glucose, maltose, mannose, galactose, lactose, isomaltulose stevia, honey, and the like. Examples of artificial sweeteners include sucralose, maltodextrin, saccharin, aspartame, acesulfame K, neotame and the like.

In some embodiments, the sweetener comprises one or more sugar alcohols. Sugar alcohols are polyols derived from monosaccharides or disaccharides that have a partially or fully hydrogenated form. Sugar alcohols have, for example, about 4 to about 20 carbon atoms and include erythritol, arabitol, ribitol, isomalt, maltitol, dulcitol, iditol, mannitol, xylitol, lactitol, sorbitol, and combinations thereof (e.g., hydrogenated starch hydrolysates). When present, a representative amount of sweetener may make up from about 0.1 to about 20 percent or more of the of the mixture by weight, for example, from about 0.1 to about 1%, from about 1 to about 5%, from about 5 to about 10%, or from about 10 to about 20% of the mixture on a weight basis, based on the total weight of the mixture.

Binding Agents

A binder (or combination of binders) may be employed in certain embodiments, in amounts sufficient to provide the desired physical attributes and physical integrity to the mixture, and binders also often function as thickening or gelling agents. Typical binders can be organic or inorganic, or a combination thereof. Representative binders include povidone, sodium alginate, starch-based binders, pectin, carrageenan, pullulan, zein, and the like, and combinations thereof. In some embodiments, the binder comprises pectin or carrageenan or combinations thereof. The amount of binder utilized in the mixture can vary, but is typically up to about 30 weight percent, and certain embodiments are characterized by a binder content of at least about 0.1% by weight, such as about 1 to about 30% by weight, or about 5 to about 10% by weight, based on the total weight of the mixture.

In certain embodiments, the binder includes a gum, for example, a natural gum. As used herein, a natural gum refers to polysaccharide materials of natural origin that have binding properties, and which are also useful as a thickening or gelling agents. Representative natural gums derived from plants, which are typically water soluble to some degree, include xanthan gum, guar gum, gum arabic, ghatti gum, gum tragacanth, karaya gum, locust bean gum, gellan gum, and combinations thereof. When present, natural gum binder materials are typically present in an amount of up to about 5% by weight, for example, from about 0.1, about 0.2, about 0.3, about 0.4, about 0.5, about 0.6, about 0.7, about 0.8, about 0.9, or about 1%, to about 2, about 3, about 4, or about 5% by weight, based on the total weight of the mixture.

Humectants

In certain embodiments, one or more humectants may be employed in the mixture. Examples of humectants include, but are not limited to, glycerin, propylene glycol, and the like. Where included, the humectant is typically provided in an amount sufficient to provide desired moisture attributes to the mixture. Further, in some instances, the humectant may impart desirable flow characteristics to the mixture for depositing in a mold. When present, a humectant will typically make up about 5% or less of the weight of the mixture (e.g., from about 0.5 to about 5% by weight). When present, a representative amount of humectant is about 0.1% to about 1% by weight, or about 1% to about 5% by weight, based on the total weight of the mixture.

Buffering Agents

In certain embodiments, the mixture of the present disclosure can comprise pH adjusters or buffering agents. Examples of pH adjusters and buffering agents that can be used include, but are not limited to, metal hydroxides (e.g., alkali metal hydroxides such as sodium hydroxide and potassium hydroxide), and other alkali metal buffers such as metal carbonates (e.g., potassium carbonate or sodium carbonate), or metal bicarbonates such as sodium bicarbonate, and the like. Where present, the buffering agent is typically present in an amount less than about 5 percent based on the weight of the mixture, for example, from about 0.5% to about 5%, such as, e.g., from about 0.75% to about 4%, from about 0.75% to about 3%, or from about 1% to about 2% by weight, based on the total weight of the mixture. Non-limiting examples of suitable buffers include alkali metals acetates, glycinates, phosphates, glycerophosphates, citrates, carbonates, hydrogen carbonates, borates, or mixtures thereof.

Colorants

A colorant may be employed in amounts sufficient to provide the desired physical attributes to the mixture. Examples of colorants include various dyes and pigments, such as caramel coloring and titanium dioxide. The amount of colorant utilized in the mixture can vary, but when present is typically up to about 3 weight percent, such as from about 0.1%, about 0.5%, or about 1%, to about 3% by weight, based on the total weight of the mixture.

Active Agent

The mixture may additionally include one or more active agents, also referred to herein as "active ingredients." As used herein, an "active ingredient" refers to one or more substances belonging to any of the following categories: API (active pharmaceutical ingredient), food additives, natural medicaments, and naturally occurring substances that can have an effect on humans. Example active ingredients would include any ingredient known to impact one or more biological functions within the body, such as ingredients that furnish pharmacological activity or other direct effect in the diagnosis, cure, mitigation, treatment, or prevention of disease, or which affect the structure or any function of the body of humans or other animals (e.g., provide a stimulating action on the central nervous system, have an energizing effect, an antipyretic or analgesic action, or an otherwise useful effect on the body). In some embodiments, the active ingredient may be of the type generally referred to as dietary supplements, nutraceuticals, "phytochemicals" or "functional foods." These types of additives are sometimes defined in the art as encompassing substances typically available from naturally-occurring sources (e.g., botanical materials) that provide one or more advantageous biological effects (e.g., health promotion, disease prevention, or other medicinal properties), but are not classified or regulated as drugs.

The active agents described herein are employed, e.g., independently and/or in encapsulated and/or foamed form as provided herein. In some embodiments, all of the active agent within a given product provided herein is in foamed or encapsulated form. In some embodiments, none of the active agent within a given product is in foamed or encapsulated form. In further embodiments, some of the active agent within a given product is in foamed or encapsulated form (and some is provided independently, i.e., not in foamed or encapsulated form).

Non-limiting examples of active ingredients include those falling in the categories of botanical ingredients, stimulants, amino acids, nicotine components, and/or pharmaceutical, nutraceutical, and medicinal ingredients (e.g., vitamins, such as A, B3, B6, B12, and C, and/or cannabinoids, such as tetrahydrocannabinol (THC) and cannabidiol (CBD)). Each of these categories is further described herein below. The particular choice of active ingredients will vary depending upon the desired flavor, texture, and desired characteristics of the particular product.

In certain embodiments, the active ingredient is selected from the group consisting of caffeine, taurine, GABA, theanine, vitamin C, B vitamins (e.g., vitamin B6 or B12), lemon balm extract, tryptophan, ginseng, citicoline, sunflower lecithin, and combinations thereof. For example, the active ingredient can include a combination of caffeine, theanine, and optionally ginseng. In another embodiment, the active ingredient includes a combination of theanine, gamma-amino butyric acid (GABA), and lemon balm extract. In a further embodiment, the active ingredient includes theanine, theanine and tryptophan, or theanine and one or more B vitamins (e.g., vitamin B6 or B12). In a still further embodiment, the active ingredient includes a combination of caffeine, taurine, and vitamin C.

The particular percentages of active ingredients present will vary depending upon the desired characteristics of the product. Typically, an active ingredient or combination thereof is present in a total concentration of at least about 0.001% by weight of the composition, such as in a range from about 0.001% to about 20%. In some embodiments, the active ingredient or combination of active ingredients is present in a concentration from about 0.1% w/w to about 10% by weight, such as, e.g., from about 0.5% w/w to about 10%, from about 1% to about 10%, from about 1% to about 5% by weight, based on the total weight of the mixture. In some embodiments, the active ingredient or combination of active ingredients is present in a concentration of from about 0.001%, about 0.01%, about 0.1%, or about 1%, up to about 20% by weight, such as, e.g., from about 0.001%, about 0.002%, about 0.003%, about 0.004%, about 0.005%, about 0.006%, about 0.007%, about 0.008%, about 0.009%, about 0.01%, about 0.02%, about 0.03%, about 0.04%, about 0.05%, about 0.06%, about 0.07%, about 0.08%, about 0.09%, about 0.1%, about 0.2%, about 0.3%, about 0.4%, about 0.5% about 0.6%, about 0.7%, about 0.8%, or about 0.9%, to about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, or about 20% by weight, based on the total weight of the mixture. Further suitable ranges for specific active ingredients are provided herein below.

Botanical

In some embodiments, the active ingredient comprises a botanical ingredient. As used herein, the term "botanical ingredient" or "botanical" refers to any plant material or fungal-derived material, including plant material in its natural form and plant material derived from natural plant materials, such as extracts or isolates from plant materials or treated plant materials (e.g., plant materials subjected to heat treatment, fermentation, bleaching, or other treatment processes capable of altering the physical and/or chemical nature of the material). For the purposes of the present disclosure, a "botanical" includes, but is not limited to, "herbal materials," which refer to seed-producing plants that do not develop persistent woody tissue and are often valued for their medicinal or sensory characteristics (e.g., teas or tisanes). Reference to botanical material as "non-tobacco" is intended to exclude tobacco materials (i.e., does not include any *Nicotiana* species). In some embodiments, the compositions as disclosed herein can be characterized as free of any tobacco material (e.g., any embodiment as disclosed herein may be completely or substantially free of any tobacco material). By "substantially free" is meant that no tobacco material has been intentionally added. For example, certain embodiments can be characterized as having less than 0.001% by weight of tobacco, or less than 0.0001%, or even 0% by weight of tobacco.

When present, a botanical is typically at a concentration of from about 0.01% w/w to about 10% by weight, such as, e.g., from about 0.01% w/w, about 0.05%, about 0.1%, or about 0.5%, to about 1%, about 2%, about 3%, about 4%, about 5%, about 6%, about 7%, about 8%, about 9%, or about 10%, about 11%, about 12%, about 13%, about 14%, or about 15% by weight, based on the total weight of the mixture.

The botanical materials useful in the present disclosure may comprise, without limitation, any of the compounds and sources set forth herein, including mixtures thereof. Certain botanical materials of this type are sometimes referred to as dietary supplements, nutraceuticals, "phytochemicals" or "functional foods." Certain botanicals, as the plant material or an extract thereof, have found use in traditional herbal medicine, and are described further herein. Non-limiting examples of botanicals or botanical-derived materials include ashwagandha, Bacopa monniera, baobab, basil, Centella asiatica, Chai-hu, chamomile, cherry blossom, chlorophyll, cinnamon, citrus, cloves, cocoa, cordyceps, curcumin, damiana, Dorstenia arifolia, Dorstenia odorata, essential oils, eucalyptus, fennel, Galphimia glauca, ginger, Ginkgo biloba, ginseng (e.g., Panax ginseng), green tea, Griffonia simplicifolia, guarana, cannabis, hemp, hops, jasmine, Kaempferia parviflora (Thai ginseng), kava, lavender, lemon balm, lemongrass, licorice, lutein, maca, matcha, Nardostachys chinensis, oil-based extract of Viola odorata, peppermint, quercetin, resveratrol, Rhizoma gastrodiae, Rhodiola, rooibos, rose essential oil, rosemary, Sceletium tortuosum, Schisandra, Skullcap, spearmint extract, Spikenard, terpenes, tisanes, turmeric, Turnera aphrodisiaca, valerian, white mulberry, and Yerba mate.

In some embodiments, the active ingredient comprises lemon balm. Lemon balm (Melissa officinalis) is a mildly lemon-scented herb from the same family as mint (Lamiaceae). The herb is native to Europe, North Africa, and West Asia. The tea of lemon balm, as well as the essential oil and the extract, are used in traditional and alternative medicine. In some embodiments, the active ingredient comprises lemon balm extract. In some embodiments, the lemon balm extract is present in an amount of from about 1 to about 4% by weight, based on the total weight of the mixture.

In some embodiments, the active ingredient comprises ginseng. Ginseng is the root of plants of the genus Panax, which are characterized by the presence of unique steroid saponin phytochemicals (ginsenosides) and gintonin. Ginseng finds use as a dietary supplement in energy drinks or herbal teas, and in traditional medicine. Cultivated species include Korean ginseng (*P. ginseng*), South China ginseng (*P. notoginseng*), and American ginseng (*P. quinquefolius*). American ginseng and Korean ginseng vary in the type and quantity of various ginsenosides present. In some embodiments, the ginseng is American ginseng or Korean ginseng. In specific embodiments, the active ingredient comprises Korean ginseng. In some embodiments, ginseng is present in an amount of from about 0.4 to about 0.6% by weight, based on the total weight of the mixture.

Stimulants

In some embodiments, the active ingredient comprises one or more stimulants. As used herein, the term "stimulant" refers to a material that increases activity of the central nervous system and/or the body, for example, enhancing focus, cognition, vigor, mood, alertness, and the like. Non-limiting examples of stimulants include caffeine, theacrine, theobromine, and theophylline. Theacrine (1,3,7,9-tetramethyluric acid) is a purine alkaloid which is structurally related to caffeine, and possesses stimulant, analgesic, and anti-inflammatory effects. Present stimulants may be natural, naturally derived, or wholly synthetic. For example, certain botanical materials (guarana, tea, coffee, cocoa, and the like) may possess a stimulant effect by virtue of the presence of e.g., caffeine or related alkaloids, and accordingly are "natural" stimulants. By "naturally derived" is meant the stimulant (e.g., caffeine, theacrine) is in a purified form, outside its natural (e.g., botanical) matrix. For example, caffeine can be obtained by extraction and purification from botanical sources (e.g., tea). By "wholly synthetic", it is meant that the stimulant has been obtained by chemical synthesis. In some embodiments, the active ingredient comprises caffeine. In some embodiments, the caffeine is present in an encapsulated form. On example of an encapsulated caffeine is Vitashure®, available from Balchem Corp., 52 Sunrise Park Road, New Hampton, NY, 10958.

When present, a stimulant or combination of stimulants (e.g., caffeine, theacrine, and combinations thereof) is typically at a concentration of from about 0.1% w/w to about 15% by weight, such as, e.g., from about 0.1% w/w, about 0.2%, about 0.3%, about 0.4%, about 0.5% about 0.6%, about 0.7%, about 0.8%, or about 0.9%, to about 1%, about 2%, about 3%, about 4%, about 5%, about 6%, about 7%, about 8%, about 9%, about 10%, about 11%, about 12%, about 13%, about 14%, or about 15% by weight, based on the total weight of the composition. In some embodiments, the composition comprises caffeine in an amount of from about 1.5 to about 6% by weight, based on the total weight of the composition;

Amino Acids

In some embodiments, the active ingredient comprises an amino acid. As used herein, the term "amino acid" refers to an organic compound that contains amine ($—NH_2$) and carboxyl (—COOH) or sulfonic acid ($SO_3H$) functional groups, along with a side chain (R group), which is specific to each amino acid. Amino acids may be proteinogenic or non-proteinogenic. By "proteinogenic" is meant that the amino acid is one of the twenty naturally occurring amino acids found in proteins. The proteinogenic amino acids include alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, and valine. By "non-proteinogenic" is meant that either the amino acid is not found naturally in protein, or is not directly produced by cellular machinery (e.g., is the product of post-tranlational modification). Non-limiting examples of non-proteinogenic amino acids include gamma-aminobutyric acid (GABA), taurine (2-aminoethanesulfonic acid), theanine (L-γ-glutamylethylamide), hydroxyproline, and beta-alanine. In some embodiments, the active ingredient comprises theanine. In some embodiments, the active ingredient comprises GABA. In some embodiments, the active ingredient comprises a combination of theanine and GABA. In some embodiments, the active ingredient is a combination of theanine, GABA, and lemon balm. In some embodiments, the active ingredient is a combination of caffeine, theanine, and ginseng. In some embodiments, the active ingredient comprises taurine. In some embodiments, the active ingredient is a combination of caffeine and taurine.

When present, an amino acid or combination of amino acids (e.g., theanine, GABA, and combinations thereof) is typically at a concentration of from about 0.1% w/w to about 15% by weight, such as, e.g., from about 0.1% w/w, about 0.2%, about 0.3%, about 0.4%, about 0.5% about 0.6%, about 0.7%, about 0.8%, or about 0.9%, to about 1%, about 2%, about 3%, about 4%, about 5%, about 6%, about 7%, about 8%, about 9%, about 10%, about 11%, about 12%, about 13%, about 14%, or about 15% by weight, based on the total weight of the composition.

Vitamins

In some embodiments, the active ingredient comprises a vitamin or combination of vitamins. As used herein, the term "vitamin" refers to an organic molecule (or related set of molecules) that is an essential micronutrient needed for the proper functioning of metabolism in a mammal. There are thirteen vitamins required by human metabolism, which are: vitamin A (as all-trans-retinol, all-trans-retinyl-esters, as well as all-trans-beta-carotene and other provitamin A carotenoids), vitamin B1 (thiamine), vitamin B2 (riboflavin), vitamin B3 (niacin), vitamin B5 (pantothenic acid), vitamin B6 (pyridoxine), vitamin B7 (biotin), vitamin B9 (folic acid or folate), vitamin B12 (cobalamins), vitamin C (ascorbic acid), vitamin D (calciferols), vitamin E (tocopherols and tocotrienols), and vitamin K (quinones). In some embodiments, the active ingredient comprises vitamin C. In some embodiments, the active ingredient is a combination of vitamin C, caffeine, and taurine.

When present, a vitamin or combination of vitamins (e.g., vitamin B6, vitamin B12, vitamin E, vitamin C, or a combination thereof) is typically at a concentration of from about 0.01% w/w to about 6% by weight, such as, e.g., from about 0.01%, about 0.02%, about 0.03%, about 0.04%, about 0.05%, about 0.06%, about 0.07%, about 0.08%, about 0.09%, or about 0.1% w/w, to about 0.2%, about 0.3%, about 0.4%, about 0.5% about 0.6%, about 0.7%, about 0.8%, about 0.9%, about 1%, about 2%, about 3%, about 4%, about 5%, or about 6% by weight, based on the total weight of the mixture.

Antioxidants

In some embodiments, the active ingredient comprises one or more antioxidants. As used herein, the term "antioxidant" refers to a substance which prevents or suppresses oxidation by terminating free radical reactions, and may delay or prevent some types of cellular damage. Antioxidants may be naturally occurring or synthetic. Naturally occurring antioxidants include those found in foods and botanical materials. Non-limiting examples of antioxidants include certain botanical materials, vitamins, polyphenols, and phenol derivatives.

Examples of botanical materials which are associated with antioxidant characteristics include without limitation acai berry, alfalfa, allspice, annatto seed, apricot oil, basil, bee balm, wild bergamot, black pepper, blueberries, borage seed oil, bugleweed, cacao, calamus root, catnip, catuaba, cayenne pepper, chaga mushroom, chervil, cinnamon, dark chocolate, potato peel, grape seed, ginseng, gingko biloba, Saint John's Wort, saw palmetto, green tea, black tea, black cohosh, cayenne, chamomile, cloves, cocoa powder, cranberry, dandelion, grapefruit, honeybush, echinacea, garlic, evening primrose, feverfew, ginger, goldenseal, hawthorn, hibiscus flower, jiaogulan, kava, lavender, licorice, marjoram, milk thistle, mints (menthe), oolong tea, beet root, orange, oregano, papaya, pennyroyal, peppermint, red clover, rooibos (red or green), rosehip, rosemary, sage, clary sage, savory, spearmint, spirulina, slippery elm bark, sorghum bran hi-tannin, sorghum grain hi-tannin, sumac bran, comfrey leaf and root, goji berries, gutu kola, thyme, turmeric, uva ursi, valerian, wild yam root, wintergreen, yacon root, yellow dock, yerba mate, yerba santa, bacopa monniera, withania somnifera, Lion's mane, and silybum marianum. Such botanical materials may be provided in fresh or dry form, essential oils, or may be in the form of an extracts. The botanical materials (as well as their extracts) often include compounds from various classes known to provide antioxidant effects, such as minerals, vitamins, isoflavones, phytoesterols, allyl sulfides, dithiolthiones, isothiocyanates, indoles, lignans, flavonoids, polyphenols, and carotenoids. Examples of compounds found in botanical extracts or oils include ascorbic acid, peanut endocarb, resveratrol, sulforaphane, beta-carotene, lycopene, lutein, co-enzyme Q, carnitine, quercetin, kaempferol, and the like. See, e.g., Santhosh et al., Phytomedicine, 12(2005) 216-220, which is incorporated herein by reference.

Non-limiting examples of other suitable antioxidants include citric acid, Vitamin E or a derivative thereof, a tocopherol, epicatechol, epigallocatechol, epigallocatechol gallate, erythorbic acid, sodium erythorbate, 4-hexylresorcinol, theaflavin, theaflavin monogallate A or B, theaflavin digallate, phenolic acids, glycosides, quercitrin, isoquercitrin, hyperoside, polyphenols, catechols, resveratrols, oleuropein, butylated hydroxyanisole (BHA), butylated hydroxytoluene (BHT), tertiary butylhydroquinone (TBHQ), and combinations thereof.

When present, an antioxidant is typically at a concentration of from about 0.001% w/w to about 10% by weight, such as, e.g., from about 0.001%, about 0.005%, about 0.01% w/w, about 0.05%, about 0.1%, or about 0.5%, to about 1%, about 2%, about 3%, about 4%, about 5%, about 6%, about 7%, about 8%, about 9%, or about 10%, based on the total weight of the mixture.

Nicotine Component

In certain embodiments, the active ingredient comprises a nicotine component. By "nicotine component" is meant any suitable form of nicotine (e.g., free base or salt) for providing oral absorption of at least a portion of the nicotine present. Typically, the nicotine component is selected from the group consisting of nicotine free base and a nicotine salt. In some embodiments, nicotine is in its free base form, which easily can be adsorbed in for example, a microcrystalline cellulose material to form a microcrystalline cellulose-nicotine carrier complex. See, for example, the discussion of nicotine in free base form in U.S. Pat. Pub. No. 2004/0191322 to Hansson, which is incorporated herein by reference.

In some embodiments, at least a portion of the nicotine can be employed in the form of a salt. Salts of nicotine can be provided using the types of ingredients and techniques set forth in U.S. Pat. No. 2,033,909 to Cox et al. and Perfetti, Beitrage Tabakforschung Int., 12: 43-54 (1983), which are incorporated herein by reference. Additionally, salts of nicotine are available from sources such as Pfaltz and Bauer, Inc. and K&K Laboratories, Division of ICN Biochemicals, Inc. Typically, the nicotine component is selected from the group consisting of nicotine free base, a nicotine salt such as hydrochloride, dihydrochloride, monotartrate, bitartrate, sulfate, salicylate, and nicotine zinc chloride. In some embodiments, the nicotine component or a portion thereof is a nicotine salt with one or more organic acids.

In some embodiments, at least a portion of the nicotine can be in the form of a resin complex of nicotine, where nicotine is bound in an ion-exchange resin, such as nicotine polacrilex, which is nicotine bound to, for example, a polymethacrilic acid, such as Amberlite IRP64, Purolite C115HMR, or Doshion P551. See, for example, U.S. Pat. No. 3,901,248 to Lichtneckert et al., which is incorporated herein by reference. Another example is a nicotine-polyacrylic carbomer complex, such as with Carbopol 974P. In some embodiments, nicotine may be present in the form of a nicotine polyacrylic complex.

Typically, the nicotine component (calculated as the free base) when present, is in a concentration of at least about 0.001% by weight of the mixture, such as in a range from about 0.001% to about 10%. In some embodiments, the nicotine component is present in a concentration from about 0.1% w/w to about 10% by weight, such as, e.g., from about 0.1% w/w, about 0.2%, about 0.3%, about 0.4%, about 0.5% about 0.6%, about 0.7%, about 0.8%, or about 0.9%, to about 1%, about 2%, about 3%, about 4%, about 5%, about 6%, about 7%, about 8%, about 9%, or about 10% by weight, calculated as the free base and based on the total weight of the mixture. In some embodiments, the nicotine component is present in a concentration from about 0.1% w/w to about 3% by weight, such as, e.g., from about 0.1% w/w to about 2.5%, from about 0.1% to about 2.0%, from about 0.1% to about 1.5%, or from about 0.1% to about 1% by weight, calculated as the free base and based on the total weight of the mixture. These ranges can also apply to other active ingredients noted herein. In some embodiments, the products or compositions of the disclosure can be characterized as free of any nicotine component (e.g., any embodiment as disclosed herein may be completely or substantially free of any nicotine component). By "substantially free" is meant that no nicotine has been intentionally added, beyond trace amounts that may be naturally present in e.g., a botanical material. For example, certain embodiments can be characterized as having less than 0.001% by weight of nicotine, or less than 0.0001%, or even 0% by weight of nicotine, calculated as the free base.

Cannabinoids

In some embodiments, the active ingredient comprises one or more cannabinoids. As used herein, the term "cannabinoid" refers to a class of diverse chemical compounds that acts on cannabinoid receptors, also known as the endocannabinoid system, in cells that alter neurotransmitter release in the brain. Ligands for these receptor proteins include the endocannabinoids produced naturally in the body by animals; phytocannabinoids, found in cannabis; and synthetic cannabinoids, manufactured artificially. Cannabinoids found in cannabis include, without limitation: cannabigerol (CBG), cannabichromene (CBC), cannabidiol (CBD), tetrahydrocannabinol (THC), cannabinol (CBN), cannabinodiol (CBDL), cannabicyclol (CBL), cannabivarin (CBV), tetrahydrocannabivarin (THCV), cannabidivarin (CBDV), cannabichromevarin (CBCV), cannabigerovarin (CBGV), cannabigerol monomethyl ether (CBGM), cannabinerolic acid, cannabidiolic acid (CBDA), cannabinol propyl variant (CBNV), cannabitriol (CBO), tetrahydrocannabinolic acid (THCA), and tetrahydrocannabivarinic acid (THCV A). In certain embodiments, the cannabinoid is selected from tetrahydrocannabinol (THC), the primary psychoactive compound in cannabis, and cannabidiol (CBD) another major constituent of the plant, but which is devoid of psychoactivity. All of the above compounds can be used in the form of an isolate from plant material or synthetically derived.

Alternatively, the active ingredient can be a cannabimimetic, which is a class of compounds derived from plants other than cannabis that have biological effects on the endocannabinoid system similar to cannabinoids. Examples include yangonin, alpha-amyrin or beta-amyrin (also classified as terpenes), cyanidin, curcumin (tumeric), catechin, quercetin, salvinorin A, N-acylethanolamines, and N-alkylamide lipids.

When present, a cannabinoid (e.g., CBD) or cannabimimetic is typically in a concentration of at least about 0.1% by weight of the composition, such as in a range from about 0.1% to about 30%, such as, e.g., from about 0.1%, about 0.2%, about 0.3%, about 0.4%, about 0.5% about 0.6%, about 0.7%, about 0.8%, or about 0.9%, to about 1%, about 2%, about 3%, about 4%, about 5%, about 6%, about 7%, about 8%, about 9%, about 10%, about 15%, about 20%, or about 30% by weight, based on the total weight of the composition.

Terpenes

Active ingredients suitable for use in the present disclosure can also be classified as terpenes, many of which are associated with biological effects, such as calming effects. Terpenes are understood to have the general formula of $(C_5H_8)_n$ and include monoterpenes, sesquiterpenes, and diterpenes. Terpenes can be acyclic, monocyclic or bicyclic in structure. Some terpenes provide an entourage effect when used in combination with cannabinoids or cannabimimetics. Examples include beta-caryophyllene, linalool, limonene, beta-citronellol, linalyl acetate, pinene (alpha or beta), geraniol, carvone, eucalyptol, menthone, iso-menthone, piperitone, myrcene, beta-bourbonene, and germacrene, which may be used singly or in combination.

Pharmaceutical Ingredients

In some embodiments, the active ingredient comprises an active pharmaceutical ingredient (API). The API can be any known agent adapted for therapeutic, prophylactic, or diagnostic use. These can include, for example, synthetic organic compounds, proteins and peptides, polysaccharides and other sugars, lipids, phospholipids, inorganic compounds (e.g., magnesium, selenium, zinc, nitrate), neurotransmitters or precursors thereof (e.g., serotonin, 5-hydroxytryptophan, oxitriptan, acetylcholine, dopamine, melatonin), and nucleic acid sequences, having therapeutic, prophylactic, or diagnostic activity. Non-limiting examples of APIs include analgesics and antipyretics (e.g., acetylsalicylic acid, acetaminophen, 3-(4-isobutylphenyl)propanoic acid), phosphatidylserine, myoinositol, docosahexaenoic acid (DHA, Omega-3), arachidonic acid (AA, Omega-6), S-adenosylmethionine (SAM), beta-hydroxy-beta-methylbutyrate (HMB), citicoline (cytidine-5'-diphosphate-choline), and cotinine. In some embodiments, the active ingredient comprises citicoline. In some embodiments, the active ingredient is a combination of citicoline, caffeine, theanine, and ginseng. In some embodiments, the active ingredient comprises sunflower lecithin. In some embodiments, the active ingredient is a combination of sunflower lecithin, caffeine, theanine, and ginseng.

The amount of API may vary. For example, when present, an API is typically at a concentration of from about 0.001% w/w to about 10% by weight, such as, e.g., from about 0.01%, about 0.02%, about 0.03%, about 0.04%, about 0.05%, about 0.06%, about 0.07%, about 0.08%, about 0.09%, about 0.1% w/w, about 0.2%, about 0.3%, about 0.4%, about 0.5% about 0.6%, about 0.7%, about 0.8%, about 0.9%, or about 1%, to about 2%, about 3%, about 4%, about 5%, about 6%, about 7%, about 8%, about 9%, or about 10% by weight, based on the total weight of the composition.

In some embodiments, the composition is substantially free of any API. By "substantially free of any API" means that the composition does not contain, and specifically excludes, the presence of any API as defined herein, such as any Food and Drug Administration (FDA) approved therapeutic agent intended to treat any medical condition.

Tobacco Material

In some embodiments, the mixture may include a tobacco material. The tobacco material can vary in species, type, and form. Generally, the tobacco material is obtained from for a harvested plant of the *Nicotiana* species. Example *Nicotiana* species include *N. tabacum, N. rustica, N. alata, N. arentsii, N. excelsior, N. forgetiana, N. glauca, N. glutinosa, N. gossei, N. kawakamii, N. knightiana, N. langsdorffi, N. otophora, N. setchelli, N. sylvestris, N. tomentosa, N. tomentosiformis, N. undulata, N. x sanderae, N. africana, N. amplexicaulis, N. benavidesii, N. bonariensis, N. debneyi, N. longiflora, N. maritina, N. megalosiphon, N. occidentalis, N. paniculata, N. plumbaginifolia, N. raimondii, N. rosulata, N. simulans, N. stocktonii, N. suaveolens, N. umbratica, N. velutina, N. wigandioides, N. acaulis, N. acuminata, N. attenuata, N. benthamiana, N. cavicola, N. clevelandii, N. cordifolia, N. corymbosa, N. fragrans, N. goodspeedii, N. linearis, N. miersii, N. nudicaulis, N. obtusifolia, N. occidentalis* subsp. *Hersperis, N. pauciflora, N. petunioides, N. quadrivalvis, N. repanda, N. rotundifolia, N. solanifolia*, and *N. spegazzinii*. Various representative other types of plants from the *Nicotiana* species are set forth in Goodspeed, *The Genus Nicotiana*, (Chonica Botanica) (1954); U.S. Pat. No. 4,660,577 to Sensabaugh, Jr. et al.; U.S. Pat. No. 5,387,416 to White et al., U.S. Pat. No. 7,025,066 to Lawson et al.; U.S. Pat. No. 7,798,153 to Lawrence, Jr. and U.S. Pat. No. 8,186,360 to Marshall et al.; each of which is incorporated herein by reference. Descriptions of various types of tobaccos, growing practices and harvesting practices are set forth in *Tobacco Production, Chemistry and Technology*, Davis et al. (Eds.) (1999), which is incorporated herein by reference.

*Nicotiana* species from which suitable tobacco materials can be obtained can be derived using genetic-modification or crossbreeding techniques (e.g., tobacco plants can be genetically engineered or crossbred to increase or decrease production of components, characteristics or attributes). See, for example, the types of genetic modifications of plants set forth in U.S. Pat. No. 5,539,093 to Fitzmaurice et al.; U.S. Pat. No. 5,668,295 to Wahab et al.; U.S. Pat. No. 5,705,624 to Fitzmaurice et al.; U.S. Pat. No. 5,844,119 to Weigl; U.S. Pat. No. 6,730,832 to Dominguez et al.; U.S. Pat. No. 7,173,170 to Liu et al.; U.S. Pat. No. 7,208,659 to Colliver et al. and U.S. Pat. No. 7,230,160 to Benning et al.; U.S. Patent Appl. Pub. No. 2006/0236434 to Conkling et al.; and PCT WO2008/103935 to Nielsen et al. See, also, the types of tobaccos that are set forth in U.S. Pat. No. 4,660,577 to Sensabaugh, Jr. et al.; U.S. Pat. No. 5,387,416 to White et al.; and U.S. Pat. No. 6,730,832 to Dominguez et al., each of which is incorporated herein by reference.

The *Nicotiana* species can, in some embodiments, be selected for the content of various compounds that are present therein. For example, plants can be selected on the basis that those plants produce relatively high quantities of one or more of the compounds desired to be isolated therefrom. In certain embodiments, plants of the *Nicotiana* species (e.g., Galpao commun tobacco) are specifically grown for their abundance of leaf surface compounds. Tobacco plants can be grown in greenhouses, growth chambers, or outdoors in fields, or grown hydroponically.

Various parts or portions of the plant of the *Nicotiana* species can be included within a mixture as disclosed herein. For example, virtually all of the plant (e.g., the whole plant) can be harvested, and employed as such. Alternatively, various parts or pieces of the plant can be harvested or separated for further use after harvest. For example, the flower, leaves, stem, stalk, roots, seeds, and various combinations thereof, can be isolated for further use or treatment. In some embodiments, the tobacco material comprises tobacco leaf (lamina). The mixture disclosed herein can include processed tobacco parts or pieces, cured and aged tobacco in essentially natural lamina and/or stem form, a tobacco extract, extracted tobacco pulp (e.g., using water as a solvent), or a mixture of the foregoing (e.g., a mixture that combines extracted tobacco pulp with granulated cured and aged natural tobacco lamina).

In certain embodiments, the tobacco material comprises solid tobacco material selected from the group consisting of lamina and stems. The tobacco that is used for the mixture most preferably includes tobacco lamina, or a tobacco lamina and stem mixture (of which at least a portion is smoke-treated). Portions of the tobaccos within the mixture may have processed forms, such as processed tobacco stems (e.g., cut-rolled stems, cut-rolled-expanded stems or cut-puffed stems), or volume expanded tobacco (e.g., puffed tobacco, such as dry ice expanded tobacco (DIET)). See, for example, the tobacco expansion processes set forth in U.S. Pat. No. 4,340,073 to de la Burde et al.; U.S. Pat. No. 5,259,403 to Guy et al.; and U.S. Pat. No. 5,908,032 to Poindexter, et al.; and U.S. Pat. No. 7,556,047 to Poindexter, et al., all of which are incorporated by reference. In addition, the d mixture optionally may incorporate tobacco that has been fermented. See, also, the types of tobacco processing techniques set forth in PCT WO2005/063060 to Atchley et al., which is incorporated herein by reference.

The tobacco material is typically used in a form that can be described as particulate (i.e., shredded, ground, granulated, or powder form). The manner by which the tobacco material is provided in a finely divided or powder type of form may vary. Preferably, plant parts or pieces are comminuted, ground or pulverized into a particulate form using equipment and techniques for grinding, milling, or the like. Most preferably, the plant material is relatively dry in form during grinding or milling, using equipment such as hammer mills, cutter heads, air control mills, or the like. For example, tobacco parts or pieces may be ground or milled when the moisture content thereof is less than about 15 weight percent or less than about 5 weight percent. Most preferably, the tobacco material is employed in the form of parts or pieces that have an average particle size between 1.4 millimeters and 250 microns. In some instances, the tobacco particles may be sized to pass through a screen mesh to obtain the particle size range required. If desired, air classification equipment may be used to ensure that small sized tobacco particles of the desired sizes, or range of sizes, may be collected. If desired, differently sized pieces of granulated tobacco may be mixed together.

The manner by which the tobacco is provided in a finely divided or powder type of form may vary. Preferably, tobacco parts or pieces are comminuted, ground or pulverized into a powder type of form using equipment and techniques for grinding, milling, or the like. Most preferably, the tobacco is relatively dry in form during grinding or milling, using equipment such as hammer mills, cutter heads, air control mills, or the like. For example, tobacco parts or pieces may be ground or milled when the moisture content thereof is less than about 15 weight percent to less than about 5 weight percent. For example, the tobacco plant or portion thereof can be separated into individual parts or pieces (e.g., the leaves can be removed from the stems, and/or the stems and leaves can be removed from the stalk). The harvested plant or individual parts or pieces can be further subdivided into parts or pieces (e.g., the leaves can be shredded, cut, comminuted, pulverized, milled or ground into pieces or parts that can be characterized as filler-type pieces, granules, particulates or fine powders). The plant, or parts thereof, can be subjected to external forces or pressure (e.g., by being pressed or subjected to roll treatment). When carrying out such processing conditions, the plant or portion thereof can have a moisture content that approximates its natural moisture content (e.g., its moisture content immediately upon harvest), a moisture content achieved by adding moisture to the plant or portion thereof, or a moisture content that results from the drying of the plant or portion thereof. For example, powdered, pulverized, ground or milled pieces of plants or portions thereof can have moisture contents of less than about 25 weight percent, often less than about 20 weight percent, and frequently less than about 15 weight percent.

For the preparation of oral products, it is typical for a harvested plant of the *Nicotiana* species to be subjected to a curing process. The tobacco materials incorporated within the mixture for inclusion within products as disclosed herein are those that have been appropriately cured and/or aged. Descriptions of various types of curing processes for various types of tobaccos are set forth in *Tobacco Production, Chemistry and Technology*, Davis et al. (Eds.) (1999). Examples of techniques and conditions for curing flue-cured tobacco are set forth in Nestor et al., *Beitrage Tabakforsch. Int,* 20, 467-475 (2003) and U.S. Pat. No. 6,895,974 to Peele, which are incorporated herein by reference. Representative techniques and conditions for air curing tobacco are set forth in U.S. Pat. No. 7,650,892 to Groves et al.; Roton et al., *Beitrage Tabakforsch. Int.,* 21, 305-320 (2005) and Staaf et al., *Beitrage Tabakforsch. Int,* 21, 321-330 (2005), which are incorporated herein by reference. Certain types of tobaccos can be subjected to alternative types of curing processes, such as fire curing or sun curing.

In certain embodiments, tobacco materials that can be employed include flue-cured or Virginia (e.g., K326), burley, sun-cured (e.g., Indian Kurnool and Oriental tobaccos, including Katerini, Prelip, Komotini, Xanthi and Yambol tobaccos), Maryland, dark, dark-fired, dark air cured (e.g., Madole, Passanda, Cubano, Jatin and Bezuki tobaccos), light air cured (e.g., North Wisconsin and Galpao tobaccos), Indian air cured, Red Russian and Rustica tobaccos, as well as various other rare or specialty tobaccos and various blends of any of the foregoing tobaccos.

The tobacco material may also have a so-called "blended" form. For example, the tobacco material may include a mixture of parts or pieces of flue-cured, burley (e.g., Malawi burley tobacco) and Oriental tobaccos (e.g., as tobacco composed of, or derived from, tobacco lamina, or a mixture of tobacco lamina and tobacco stem). For example, a representative blend may incorporate about 30 to about 70 parts burley tobacco (e.g., lamina, or lamina and stem), and about 30 to about 70 parts flue cured tobacco (e.g., stem, lamina, or lamina and stem) on a dry weight basis. Other example tobacco blends incorporate about 75 parts flue-cured tobacco, about 15 parts burley tobacco, and about 10 parts Oriental tobacco; or about 65 parts flue-cured tobacco, about 25 parts burley tobacco, and about 10 parts Oriental tobacco; or about 65 parts flue-cured tobacco, about 10 parts burley tobacco, and about 25 parts Oriental tobacco; on a dry weight basis. Other example tobacco blends incorporate about 20 to about 30 parts Oriental tobacco and about 70 to about 80 parts flue-cured tobacco on a dry weight basis.

Tobacco materials used in the present disclosure can be subjected to, for example, fermentation, bleaching, and the like. If desired, the tobacco materials can be, for example, irradiated, pasteurized, or otherwise subjected to controlled heat treatment. Such treatment processes are detailed, for example, in U.S. Pat. No. 8,061,362 to Mua et al., which is incorporated herein by reference. In certain embodiments, tobacco materials can be treated with water and an additive capable of inhibiting reaction of asparagine to form acrylamide upon heating of the tobacco material (e.g., an additive selected from the group consisting of lysine, glycine, histidine, alanine, methionine, cysteine, glutamic acid, aspartic acid, proline, phenylalanine, valine, arginine, compositions incorporating di- and trivalent cations, asparaginase, certain non-reducing saccharides, certain reducing agents, phenolic compounds, certain compounds having at least one free thiol group or functionality, oxidizing agents, oxidation catalysts, natural plant extracts (e.g., rosemary extract), and combinations thereof. See, for example, the types of treatment processes described in U.S. Pat. Pub. Nos. 8,434,496, 8,944, 072, and 8,991,403 to Chen et al., which are all incorporated herein by reference. In certain embodiments, this type of treatment is useful where the original tobacco material is subjected to heat in the processes previously described.

In some embodiments, the type of tobacco material is selected such that it is initially visually lighter in color than other tobacco materials to some degree (e.g., whitened or bleached). Tobacco pulp can be whitened in certain embodiments according to any means known in the art. For example, bleached tobacco material produced by various whitening methods using various bleaching or oxidizing agents and oxidation catalysts can be used. Example oxidizing agents include peroxides (e.g., hydrogen peroxide), chlorite salts, chlorate salts, perchlorate salts, hypochlorite salts, ozone, ammonia, potassium permanganate, and combinations thereof. Example oxidation catalysts are titanium dioxide, manganese dioxide, and combinations thereof. Processes for treating tobacco with bleaching agents are discussed, for example, in U.S. Pat. No. 787,611 to Daniels, Jr.; U.S. Pat. No. 1,086,306 to Oelenheinz; U.S. Pat. No. 1,437, 095 to Delling; U.S. Pat. No. 1,757,477 to Rosenhoch; U.S. Pat. No. 2,122,421 to Hawkinson; U.S. Pat. No. 2,148,147 to Baier; U.S. Pat. No. 2,170,107 to Baier; U.S. Pat. No. 2,274,649 to Baier; U.S. Pat. No. 2,770,239 to Prats et al.; U.S. Pat. No. 3,612,065 to Rosen; U.S. Pat. No. 3,851,653 to Rosen; U.S. Pat. No. 3,889,689 to Rosen; U.S. Pat. No. 3,943,940 to Minami; U.S. Pat. No. 3,943,945 to Rosen; U.S. Pat. No. 4,143,666 to Rainer; U.S. Pat. No. 4,194,514 to Campbell; U.S. Pat. Nos. 4,366,823, 4,366,824, and 4,388,933 to Rainer et al.; U.S. Pat. No. 4,641,667 to Schmekel et al.; U.S. Pat. No. 5,713,376 to Berger; U.S. Pat. No. 9,339,058 to Byrd Jr. et al.; U.S. Pat. No. 9,420,825 to Beeson et al.; and U.S. Pat. No. 9,950,858 to Byrd Jr. et al.; as well as in U.S. Pat. App. Pub. Nos. 2012/0067361 to Bjorkholm et al.; 2016/0073686 to Crooks; 2017/0020183 to Bjorkholm; and 2017/0112183 to Bjorkholm, and in PCT Publ. Appl. Nos. WO1996/031255 to Giolvas and WO2018/ 083114 to Bjorkholm, all of which are incorporated herein by reference.

In some embodiments, the whitened tobacco material can have an ISO brightness of at least about 50%, at least about 60%, at least about 65%, at least about 70%, at least about 75%, or at least about 80%. In some embodiments, the whitened tobacco material can have an ISO brightness in the range of about 50% to about 90%, about 55% to about 75%, or about 60% to about 70%. ISO brightness can be measured according to ISO 3688:1999 or ISO 2470-1:2016.

In some embodiments, the whitened tobacco material can be characterized as lightened in color (e.g., "whitened") in comparison to an untreated tobacco material. White colors are often defined with reference to the International Commission on Illumination's (CIE's) chromaticity diagram. The whitened tobacco material can, in certain embodiments, be characterized as closer on the chromaticity diagram to pure white than an untreated tobacco material.

In various embodiments, the tobacco material can be treated to extract a soluble component of the tobacco material therefrom. "Tobacco extract" as used herein refers to the isolated components of a tobacco material that are extracted from solid tobacco pulp by a solvent that is brought into contact with the tobacco material in an extraction process. Various extraction techniques of tobacco materials can be used to provide a tobacco extract and tobacco solid material. See, for example, the extraction processes described in U.S. Pat. Appl. Pub. No. 2011/0247640 to Beeson et al., which is incorporated herein by reference. Other example techniques for extracting components of tobacco are described in U.S. Pat. No. 4,144,895 to Fiore; U.S. Pat. No. 4,150,677 to Osborne, Jr. et al.; U.S. Pat. No. 4,267,847 to Reid; U.S. Pat. No. 4,289,147 to Wildman et al.; U.S. Pat. No. 4,351,346 to Brummer et al.; U.S. Pat. No. 4,359,059 to Brummer et al.; U.S. Pat. No. 4,506,682 to Muller; U.S. Pat. No. 4,589,428 to Keritsis; U.S. Pat. No. 4,605,016 to Soga et al.; U.S. Pat. No. 4,716,911 to Poulose et al.; U.S. Pat. No. 4,727,889 to Niven, Jr. et al.; U.S. Pat. No. 4,887,618 to Bernasek et al.; U.S. Pat. No. 4,941,484 to Clapp et al.; U.S. Pat. No. 4,967,771 to Fagg et al.; U.S. Pat. No. 4,986,286 to Roberts et al.; U.S. Pat. No. 5,005,593 to Fagg et al.; U.S. Pat. No. 5,018,540 to Grubbs et al.; U.S. Pat. No. 5,060,669 to White et al.; U.S. Pat. No. 5,065,775 to Fagg; U.S. Pat. No. 5,074,319 to White et al.; U.S. Pat. No. 5,099,862 to White et al.; U.S. Pat. No. 5,121,757 to White et al.; U.S. Pat. No. 5,131,414 to Fagg; U.S. Pat. No. 5,131,415 to Munoz et al.; U.S. Pat. No. 5,148,819 to Fagg; U.S. Pat. No. 5,197,494 to Kramer; 5,230,354 to Smith et al.; U.S. Pat. No. 5,234,008 to Fagg; U.S. Pat. No. 5,243,999 to Smith; U.S. Pat. No. 5,301,694 to Raymond et al.; U.S. Pat. No. 5,318,050 to Gonzalez-Parra et al.; U.S. Pat. No. 5,343,879 to Teague; U.S. Pat. No. 5,360,022 to Newton; U.S. Pat. No. 5,435,325 to Clapp et al.; U.S. Pat. No. 5,445,169 to Brinkley et al.; U.S. Pat. No. 6,131,584 to Lauterbach; U.S. Pat. No. 6,298,859 to Kierulff et al.; U.S. Pat. No. 6,772,767 to Mua et al.; and U.S. Pat. No. 7,337,782 to Thompson, all of which are incorporated by reference herein.

Typical inclusion ranges for tobacco materials can vary depending on the nature and type of the tobacco material, and the intended effect on the final mixture, with an example range of up to about 30% by weight (or up to about 20% by weight or up to about 10% by weight or up to about 5% by weight), based on total weight of the mixture (e.g., about 0.1 to about 15% by weight). In some embodiments, the products of the disclosure can be characterized as completely free or substantially free of tobacco material (other than purified nicotine as an active ingredient). For example, certain embodiments can be characterized as having less than 1% by weight, or less than 0.5% by weight, or less than 0.1% by weight of tobacco material, or 0% by weight of tobacco material.

Other Additives

Other additives can be included in the disclosed mixture within oral pouched products provided herein. For example, the mixture can be processed, blended, formulated, combined and/or mixed with other materials or ingredients. The additives can be artificial, or can be obtained or derived from herbal or biological sources. Examples of further types of additives include thickening or gelling agents (e.g., fish gelatin), emulsifiers, oral care additives (e.g., thyme oil, eucalyptus oil, and zinc), preservatives (e.g., potassium sorbate and the like), disintegration aids, zinc or magnesium salts selected to be relatively water-soluble for compositions with greater water solubility (e.g., magnesium or zinc gluconate) or selected to be relatively water-insoluble for compositions with reduced water solubility (e.g., magnesium or zinc oxide), or combinations thereof. See, for example, those representative components, combination of components, relative amounts of those components, and manners and methods for employing those components, set forth in U.S. Pat. No. 9,237,769 to Mua et al., U.S. Pat. No. 7,861,728 to Holton, Jr. et al., U.S. Pat. App. Pub. No. 2010/0291245 to Gao et al., and U.S. Pat. App. Pub. No. 2007/0062549 to Holton, Jr. et al., each of which is incorporated herein by reference. Typical inclusion ranges for such additional additives can vary depending on the nature and function of the additive and the intended effect on the final mixture, with an example range of up to about 10% by weight, based on total weight of the mixture (e.g., about 0.1 to about 5% by weight). The aforementioned additives can be employed together (e.g., as additive formulations) or separately (e.g., individual additive components can be added at different stages involved in the preparation of the final mixture). Furthermore, the aforementioned types of additives may be encapsulated as provided in the final product or mixture. Example encapsulated additives are described, for example, in WO2010/132444 to Atchley, which has been previously incorporated by reference herein.

In some embodiments, any one or more of a filler component, a tobacco material, and the overall oral product described herein can be described as a particulate material. As used herein, the term "particulate" refers to a material in the form of a plurality of individual particles, some of which can be in the form of an agglomerate of multiple particles, wherein the particles have an average length to width ratio less than 2:1, such as less than 1.5:1, such as about 1:1. In various embodiments, the particles of a particulate material can be described as substantially spherical or granular.

The particle size of a particulate material may be measured by sieve analysis. As the skilled person will readily appreciate, sieve analysis (otherwise known as a gradation test) is a method used to measure the particle size distribution of a particulate material. Typically, sieve analysis involves a nested column of sieves which comprise screens, preferably in the form of wire mesh cloths. A pre-weighed sample may be introduced into the top or uppermost sieve in the column, which has the largest screen openings or mesh size (i.e. the largest pore diameter of the sieve). Each lower sieve in the column has progressively smaller screen openings or mesh sizes than the sieve above. Typically, at the base of the column of sieves is a receiver portion to collect any particles having a particle size smaller than the screen opening size or mesh size of the bottom or lowermost sieve in the column (which has the smallest screen opening or mesh size).

In some embodiments, the column of sieves may be placed on or in a mechanical agitator. The agitator causes the vibration of each of the sieves in the column. The mechanical agitator may be activated for a pre-determined period of time in order to ensure that all particles are collected in the correct sieve. In some embodiments, the column of sieves is agitated for a period of time from 0.5 minutes to 10 minutes, such as from 1 minute to 10 minutes, such as from 1 minute to 5 minutes, such as for approximately 3 minutes. Once the agitation of the sieves in the column is complete, the material collected on each sieve is weighed. The weight of each sample on each sieve may then be divided by the total weight in order to obtain a percentage of the mass retained on each sieve. As the skilled person will readily appreciate, the screen opening sizes or mesh sizes for each sieve in the column used for sieve analysis may be selected based on the granularity or known maximum/minimum particle sizes of the sample to be analysed. In some embodiments, a column of sieves may be used for sieve analysis, wherein the column comprises from 2 to 20 sieves, such as from 5 to 15 sieves. In some embodiments, a column of sieves may be used for sieve analysis, wherein the column comprises 10 sieves. In some embodiments, the largest screen opening or mesh sizes of the sieves used for sieve analysis may be 1000 µm, such as 500 µm, such as 400 µm, such as 300 µm.

In some embodiments, any particulate material referenced herein (e.g., filler component, tobacco material, and the overall oral product) can be characterized as having at least 50% by weight of particles with a particle size as measured by sieve analysis of no greater than about 1000 µm, such as no greater than about 500 µm, such as no greater than about 400 µm, such as no greater than about 350 µm, such as no greater than about 300 µm. In some embodiments, at least 60% by weight of the particles of any particulate material referenced herein have a particle size as measured by sieve analysis of no greater than about 1000 µm, such as no greater than about 500 µm, such as no greater than about 400 µm, such as no greater than about 350 µm, such as no greater than about 300 µm. In some embodiments, at least 70% by weight of the particles of any particulate material referenced herein have a particle size as measured by sieve analysis of no greater than about 1000 µm, such as no greater than about 500 µm, such as no greater than about 400 µm, such as no greater than about 350 µm, such as no greater than about 300 µm. In some embodiments, at least 80% by weight of the particles of any particulate material referenced herein have a particle size as measured by sieve analysis of no greater than about 1000 µm, such as no greater than about 500 µm, such as no greater than about 400 µm, such as no greater than about 350 µm, such as no greater than about 300 µm. In some embodiments, at least 90% by weight of the particles of any particulate material referenced herein have a particle size as measured by sieve analysis of no greater than about 1000 µm, such as no greater than about 500 µm, such as no greater than about 400 µm, such as no greater than about 350 µm, such as no greater than about 300 µm. In some embodiments, at least 95% by weight of the particles of any particulate material referenced herein have a particle size as measured by sieve analysis of no greater than about 1000 µm, such as no greater than about 500 µm, such as no greater than about 400 µm, such as no greater than about 350 µm, such as no greater than about 300 µm. In some embodiments, at least 99% by weight of the particles of any particulate material referenced herein have a particle size as measured by sieve analysis of no greater than about 1000 µm, such as no greater than about 500 µm, such as no greater than about 400 µm, such as no greater than about 350 µm, such as no greater than about 300 µm. In some embodiments, approximately 100% by weight of the particles of any particulate material referenced herein have a particle size as measured by sieve analysis of no greater than about 1000 µm, such as no greater than about 500 µm, such as no greater than about 400 µm, such as no greater than about 350 µm, such as no greater than about 300 µm.

In some embodiments, at least 50% by weight, such as at least 60% by weight, such as at least 70% by weight, such as at least 80% by weight, such as at least 90% by weight, such as at least 95% by weight, such as at least 99% by weight of the particles of any particulate material referenced herein have a particle size as measured by sieve analysis of from about 0.01 µm to about 1000 µm, such as from about 0.05 µm to about 750 µm, such as from about 0.1 µm to about 500 µm, such as from about 0.25 µm to about 500 µm. In some embodiments, at least 50% by weight, such as at least 60% by weight, such as at least 70% by weight, such as at least 80% by weight, such as at least 90% by weight, such as at least 95% by weight, such as at least 99% by weight of the particles of any particulate material referenced herein have a particle size as measured by sieve analysis of from about 10 µm to about 400 µm, such as from about 50 µm to about 350 µm, such as from about 100 µm to about 350 µm, such as from about 200 µm to about 300 µm.

Preparation of the Mixture

The manner by which the various components of the mixture are combined may vary. As such, the overall mixture of various components with e.g., powdered mixture components may be relatively uniform in nature. The components noted above, which may be in liquid or dry solid form, can be admixed in a pretreatment step prior to mixture with any remaining components of the mixture, or simply mixed together with all other liquid or dry ingredients. The various components of the mixture may be contacted, combined, or mixed together using any mixing technique or equipment known in the art. Any mixing method that brings the mixture ingredients into intimate contact can be used, such as a mixing apparatus featuring an impeller or other structure capable of agitation. Examples of mixing equipment include casing drums, conditioning cylinders or drums, liquid spray apparatus, conical-type blenders, ribbon blenders, mixers available as FKM130, FKM600, FKM1200, FKM2000 and FKM3000 from Littleford Day, Inc., Plough Share types of mixer cylinders, Hobart mixers, and the like. See also, for example, the types of methodologies set forth in U.S. Pat. No. 4,148,325 to Solomon et al.; U.S. Pat. No. 6,510,855 to Korte et al.; and U.S. Pat. No. 6,834,654 to Williams, each of which is incorporated herein by reference. In some embodiments, the components forming the mixture are prepared such that the mixture thereof may be used in a starch molding process for forming the mixture. Manners and methods for formulating mixtures will be apparent to those skilled in the art. See, for example, the types of methodologies set forth in U.S. Pat. No. 4,148,325 to Solomon et al.; U.S. Pat. No. 6,510,855 to Korte et al.; and U.S. Pat. No. 6,834,654 to Williams, U.S. Pat. No. 4,725,440 to Ridgway et al., and U.S. Pat. No. 6,077,524 to Bolder et al., each of which is incorporated herein by reference.

Other Types of Products

As referenced, the disclosed foamed components and encapsulated components can, in some embodiments, be incorporated into other types of oral products. Such oral products may include, but are not limited to, gels, pastilles, gums, lozenges, and the like. Certain such products may be dissolvable. As used herein, the terms "dissolve," "dissolving," and "dissolvable" refer to products or components thereof having aqueous-soluble components that interact with moisture in the oral cavity and enter into solution, thereby causing gradual consumption of the product.

According to one aspect, the dissolvable product is capable of lasting in the user's mouth for a given period of time until it completely dissolves. Dissolution rates can vary over a wide range, from about 1 minute or less to about 60 minutes. For example, fast release mixtures typically dissolve and/or release the active substance in about 2 minutes or less, often about 1 minute or less (e.g., about 50 seconds or less, about 40 seconds or less, about 30 seconds or less, or about 20 seconds or less). Dissolution can occur by any means, such as melting, mechanical disruption (e.g., chewing), enzymatic or other chemical degradation, or by disruption of the interaction between the components of the mixture. In some embodiments, the product can be meltable as discussed, for example, in U.S. Patent App. Pub. No. 201210037175 to Cantrell et al. In other embodiments, the products do not dissolve during the product's residence in the user's mouth. Certain products of the disclosure are in the form of solids. Certain products can exhibit, for example, one or more of the following characteristics: crispy, granular, chewy, syrupy, pasty, fluffy, smooth, and/or creamy.

As used herein, the term "pastille" refers to a dissolvable oral product made by solidifying a liquid or gel mixture so that the final product is a somewhat hardened solid gel. The rigidity of the gel is highly variable.

As used herein, "lozenge" means a dissolvable oral product that is generally in hard form. Nicotine-containing lozenge, mini lozenge, tablet, and microtab types of products have been marketed under the tradenames "Commit," "Nicorette," "Nicotinell" and "NiQuitin." See, also, the types of nicotine-containing lozenges, lozenge formulations, lozenge formats and configurations, lozenge characteristics and techniques for formulating or manufacturing lozenges set forth in U.S. Pat. No. 4,967,773 to Shaw; U.S. Pat. No. 5,110,605 to Acharya; U.S. Pat. No. 5,733,574 to Dam; U.S. Pat. No. 6,280,761 to Santus; U.S. Pat. No. 6,676,959 to Andersson et al.; U.S. Pat. No. 6,248,760 to Wilhelmsen; and U.S. Pat. No. 7,374,779; U.S. Pat. Pub. Nos. 2001/0016593 to Wilhelmsen; 2004/0101543 to Liu et al.; 2006/0120974 to Mcneight; 2008/0020050 to Chau et al.; 2009/0081291 to Gin et al.; and 2010/0004294 to Axelsson et al.; which are incorporated herein by reference.

Method of Modifying Active Agent/Flavorant Release Profile of an Oral Product

In another aspect is provided a method of providing an oral product with modified active agent and/or flavorant release profile (e.g., relative to conventional oral pouched products). Generally, the method comprises providing an active agent and/or flavorant in encapsulated or foamed form. Such forms can, in some embodiments, be combined with other active agents and/or flavorants (i.e., not in encapsulated or foamed form).

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A composition, comprising:
   a foam comprising a lipid, wherein the lipid comprises a food-grade oil, and a component selected from the group consisting of an active agent, a flavorant, and combinations thereof; and
   a carrier,
   wherein the foam is adsorbed onto the carrier, and
   wherein the composition comprises substantially no tobacco material, other than nicotine where present.

2. The composition of claim 1, wherein the carrier is microcrystalline cellulose.

3. The composition of claim 2, wherein the microcrystalline cellulose is in particulate form.

4. The composition of claim 1, wherein the active agent is selected from the group consisting of a nicotine component, a botanical, a stimulant, a nutraceutical, an amino acid, a vitamin, a cannabinoid, a cannabimimetic, a terpene, and combinations thereof.

5. The composition of claim 1, wherein the active agent comprises nicotine.

6. The composition of claim 1, wherein the active agent comprises caffeine.

7. An oral product comprising the composition of claim 1.

8. The oral product of claim 7, in the form of a lozenge.

9. The oral product of claim 7, in the form of an oral product comprising a material within a porous pouch.

10. The oral product of claim 9, wherein the material within the porous pouch comprises the composition.

11. An oral product comprising an encapsulated agent, wherein the encapsulated agent comprises:
    a porous bead comprising an exterior portion and an interior portion comprising a lipid, wherein the lipid comprises a food-grade oil, and a component selected from the group consisting of an active agent, a flavorant, and combinations thereof,
    wherein the exterior portion comprises starch alginate, and
    wherein the oral product comprises substantially no tobacco material, other than nicotine where present.

12. The oral product of claim 11, wherein the active agent is selected from the group the active agent is selected from the group consisting of a nicotine component, a botanical, a stimulant, a nutraceutical, an amino acid, a vitamin, a cannabinoid, a cannabimimetic, a terpene, and combinations thereof.

13. The oral product of claim 11, wherein the active agent comprises nicotine.

14. The oral product of claim 11, wherein the active agent comprises caffeine.

15. The oral product of claim 11, in the form of a lozenge.

16. The oral product of claim 11, in the form of an oral pouched product comprising a material within a porous pouch.

17. The oral product of claim 16, wherein the material comprises the encapsulated agent.

18. The oral product of claim 17, wherein the porous pouch material comprises a fleece, and wherein the encapsulated agent is associated with the fleece.

19. The oral product of claim 18, wherein the encapsulated agent is imbedded in the fleece.

20. The composition of claim 1, wherein the food-grade oil is selected from the group consisting of a vegetable oil, an animal oil, or a mineral oil.

21. The composition of claim 1, wherein the food-grade oil is selected from palm oil, palm kernel oil, soybean oil, sunflower oil, cottonseed oil, coconut oil, and mixtures thereof.

22. The oral product of claim 11, wherein the food-grade oil is selected from the group consisting of a vegetable oil, an animal oil, or a mineral oil.

23. The oral product of claim 11, wherein the food-grade oil is selected from palm oil, palm kernel oil, soybean oil, sunflower oil, cottonseed oil, coconut oil, and mixtures thereof.

24. The composition of claim 1, wherein the component begins being released into a user's mouth about 1 minute or more after being placed in the user's mouth.

25. The composition of claim 1, wherein the component is released into a user's mouth over a period of time lasting about 1 minute or more.

* * * * *